US007280892B2

(12) United States Patent
Bavel

(10) Patent No.: US 7,280,892 B2
(45) Date of Patent: Oct. 9, 2007

(54) INTEGRATED SAP FLOW MONITORING, DATA LOGGING, AUTOMATIC IRRIGATION CONTROL SCHEDULING SYSTEM

(76) Inventor: Michael Van Bavel, 10808 Fallstone #350, Houston, TX (US) 77099

( * ) Notice: Subject to any disclaimer, the term of this patent is extended or adjusted under 35 U.S.C. 154(b) by 0 days.

(21) Appl. No.: 10/983,561

(22) Filed: Nov. 8, 2004

(65) Prior Publication Data

US 2005/0121536 A1 Jun. 9, 2005

Related U.S. Application Data

(60) Provisional application No. 60/517,984, filed on Nov. 6, 2003.

(51) Int. Cl.
*G06F 19/00* (2006.01)

(52) U.S. Cl. .......................................... 700/284; 239/69

(58) Field of Classification Search .................. 700/11, 700/284; 239/69
See application file for complete search history.

(56) References Cited

U.S. PATENT DOCUMENTS

| | | | | |
|---|---|---|---|---|
| 5,311,769 | A | 5/1994 | Hetzel | |
| 5,389,311 | A | 2/1995 | Hetzel | |
| 5,423,206 | A | 6/1995 | Hetzel | |
| 5,870,302 | A * | 2/1999 | Oliver | 700/11 |
| 6,343,255 | B1 * | 1/2002 | Peek et al. | 702/3 |
| 6,675,098 | B2 * | 1/2004 | Peek et al. | 702/3 |
| 2005/0171646 | A1 * | 8/2005 | Miller | 700/284 |

OTHER PUBLICATIONS

Michael G. Van Bavel, "System Solutions for Real-Time Sap Flow" Journal of Water and Irrigation Review, 1993, pp. 25-29, vol. 13, No. 1, International Water and Irrigation, Tel Aviv, Israel.

Michael G. Van Bavel, "Stem-Flow Gauges for Measurement of Crop Water Use", Proceedings of the International Irrigation Exposition and Technical Conference,1992, pp. 59-72, Irrigation Association, Falls Church, VA.

D.A. Devitt, M. Berkowitz, P.J. Schulte, R.L. Morris, "Estimating Transpiration for Three Woody Ornamental Tree Species Using Stem-Flow Gauges and Lysimetry", HortScience, 1993, vol. 28, No. 3, American Society of Horticultural Science, Alexandria, VA.

(Continued)

*Primary Examiner*—Kidest Bahta
(74) *Attorney, Agent, or Firm*—Harrison Law Office

(57) ABSTRACT

An integrated system for monitoring sap flow and simultaneously performing data-logging and automatically scheduling irrigation in a field; comprising a plurality of in situ sap flow gauges that perform its comprehensive computer-controlled tasks in the field being irrigated. This plurality of sap flow gauge can be detached from and reattached to a like plurality of plant stems as appropriate. A scaling mechanism is used to calculate crop water usage in variously-sized fields. An integrated portable computer apparatus is programmed to perform a plurality of actions including sap flow monitoring via a controller and data-logger; data-logging and automatic irrigation scheduling; a plurality of sap flow gauges; an automatic rain gage; a water meter; an irrigation valve actuator; and any auxiliary and independent weather or soil monitoring sensors. The system is connected to a PC, mounted in a weatherproof enclosure, and powered by rechargeable battery, solar panel, or AC mains power with battery backup. Computerized monitoring and control procedures are initialized via a custom-developed graphical user interface. At any predetermined interval set by a user, the depth or volume of water required to balance transpiration losses is calculated and irrigation is then automatically triggered. The system affords closed loop control with water flow from soil through plant to atmosphere and from irrigation—and having the benefit of a feedback loop.

30 Claims, 16 Drawing Sheets

OTHER PUBLICATIONS

Michael G. Van Bavel, "Advances in Micro Irrigation Control by Sap-Flow Monitoring Systems", Proceedings of the Fifth Micro Irrigation Conference. 1995. pp. 234-238, American Society of Agricultural and Biological Engineers, St. Joseph, MI, no date.

R.L. Snyder, M. Orany, S. Matyak, S. Eching, "Crop Coefficient" On-Line Publication (http://biomet.ucdavis.edu/evapotranspiration/cropcoef/crop_coefficients.htm),2001, Jan. 25, Regents of the University of California, Davis, CA, no date.

John Ossa, Editor, Jim McCabe, Water Management Committee, of of the Irrigation Association, "Landscape Irrigation Scheduling and Water Management"(Book), Mar. 2005, Part 1, p. 1-56, Irrigation Association, Falls Church, VA.

Richard G. Allen, Luis S. Pereira, D. Raes, M. Smith, "Crop Evapotranspiration—Guidelines for Computing Crop Water Requirements—FAQ Irrigation and Drainage Paper 56", (Book) ISBN 92-5-104219-5, 1998, FAQ- Food and Agriculture Organisation of the United Nations, Rome, Italy.

Michael G. Van Bavel"Vine Sap Flow Stress Measurement", Foster Presentation; Unified Wine and Grape Symposium, Jan. 2005, Dynamax Inc., Houston, TX.

* cited by examiner

Solar Panel Calculations - Flow4 with Soil moisturer sensor.

| Sensor | Power Each Sensor Watts | Qty | Total W | Volts | Amps |
|---|---|---|---|---|---|
| SGA5 | 0.10 | 0 | 0.00 | 4.0 | 0.00 |
| SGA9 | 0.15 | 0 | 0.00 | 4.0 | 0.00 |
| SGA10 | 0.15 | 0 | 0.00 | 4.0 | 0.00 |
| SGA13 | 0.20 | 0 | 0.00 | 4.0 | 0.00 |
| SGB16 | 0.25 | 1 | 0.31 | 4.5 | 0.03 |
| SGB19 | 0.40 | 1 | 0.50 | 4.5 | 0.04 |
| SGB25 | 0.50 | 0 | 0.00 | 4.5 | 0.00 |
| SGB35 | 1.20 | 1 | 1.50 | 6.0 | 0.13 |
| SGB50 | 2.00 | 1 | 2.50 | 6.0 | 0.21 |
| System Power | 1.20 | 1 | 1.20 | 6.0 | 0.10 |
| | **Total** | **5** | **6.0125** | | **0.50** |

| See insulation Chart | |
|---|---|
| **ESH Examples** | |
| Canada | 2.0 - 2.5 |
| USA | 3.5 - 5.0 |
| India | 7.0 |
| Brazil | 4.0 |
| Africa | 4.5 - 7.0 |
| Australia | 2.5 - 5.0 |
| Spain | 3.5 |

| Solar Panel Current Out | |
|---|---|
| MSX60 | 3.56 |
| MSX40 | 2.37 |
| MSX20 | 1.19 |
| MSX10 | 0.59 |

| | | |
|---|---|---|
| Sum all sensors | Total Amps | 0.50 Amp |
| Safety Factor 20% | X1.2 | 0.60 Amp |
| 24 Hr Consumption | X24 Hr | 14.43 AHrs |
| Consumption w/Power Down | X15 Hr | 9.02 AHrs |
| Enter Equivalent Sun Hours (ESH) | 5 | |
| Backup Battery | 10 | |
| Battery Amperage | 90 | |
| **Quantity of 90 Ahr Batteries Needed** | **1.6** | |
| **Quantity of 90 Ahr Batteries Needed** | **1.0** | |

| | |
|---|---|
| 2.89 | Array Current Required (24 H Oper.) |
| 1.80 | Array Current Required (15 H Oper.) |
| **Solar Panel Type Required - 24 Hr** | **2.89** |
| **Quantity of Solar Panels Required** | **0.81** |
| **Solar Panel Type Required - 15 Hr** | **1.80** |
| **Quantity of Solar Panels Required** | **0.80** |

FIG. 9

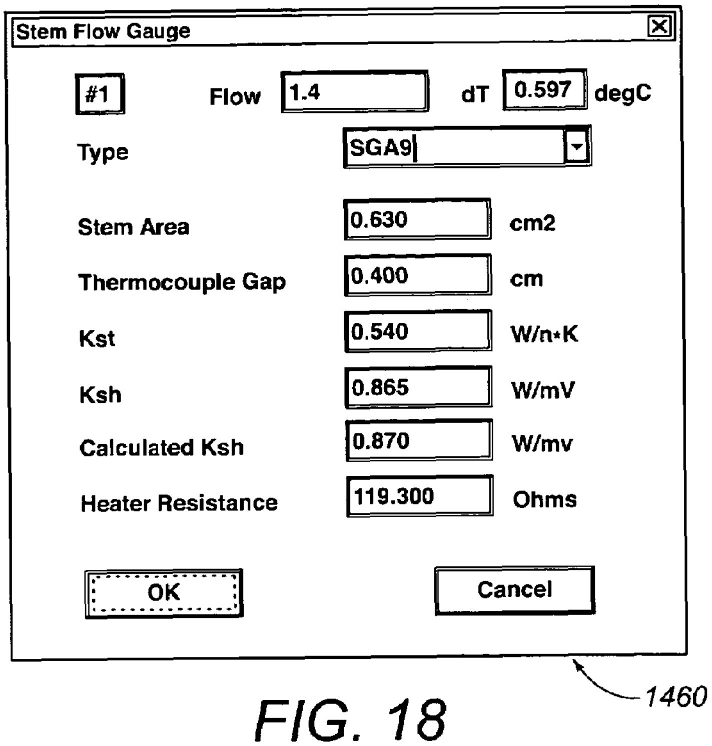

FIG. 18

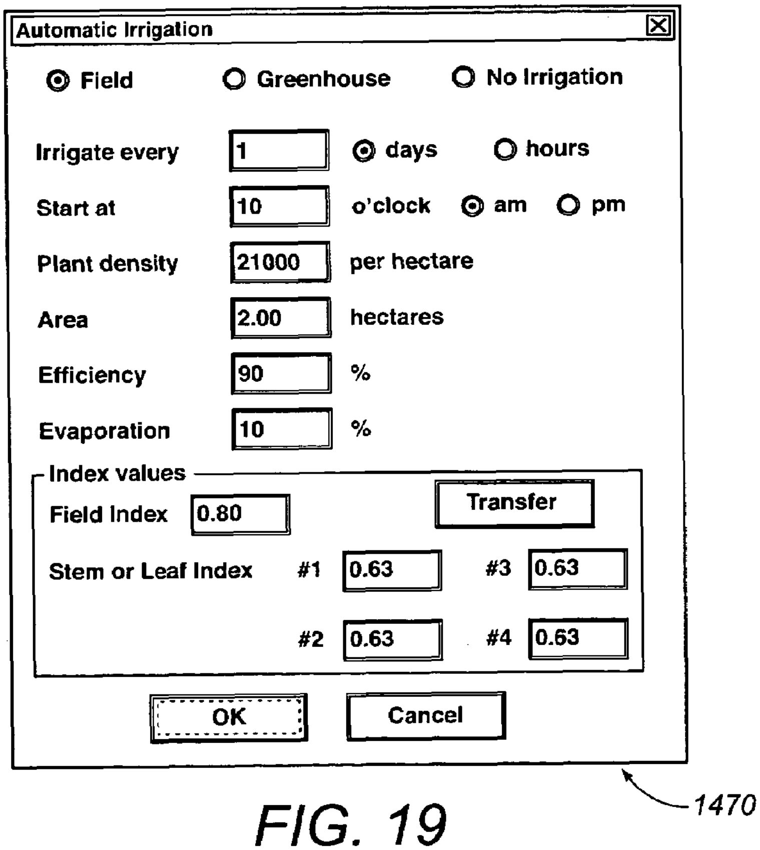

FIG. 19

Stem Flow Gauge

| | | |
|---|---|---|
| #1 Flow 1.4 | dT 0.597 | degC |
| Type | SGA9 | |
| Stem Area | 0.630 | cm2 |
| Thermocouple Gap | 0.400 | cm |
| Kst | 0.540 | W/n·K |
| Ksh | 0.865 | W/mV |
| Calculated Ksh | 0.870 | W/mv |
| Heater Resistance | 119.300 | Ohms |

[ OK ]   [ Cancel ]

*FIG. 18*   —1460

Automatic Irrigation

◉ Field   ○ Greenhouse   ○ No Irrigation

| | | |
|---|---|---|
| Irrigate every | 1 | ◉ days  ○ hours |
| Start at | 10 | o'clock  ◉ am  ○ pm |
| Plant density | 21000 | per hectare |
| Area | 2.00 | hectares |
| Efficiency | 90 | % |
| Evaporation | 10 | % |

Index values

Field Index  0.80      [ Transfer ]

Stem or Leaf Index   #1 0.63   #3 0.63
                     #2 0.63   #4 0.63

[ OK ]   [ Cancel ]

Figure 24

K-Factor

| # | Pipe Schedule | Pipe Fitting | Pipe Size | Fitting Type | K Factor Gallons | Liter | A Factor GPM | LPM |
|---|---|---|---|---|---|---|---|---|
| 1. | 80 | PV8S020 | 2 in. | Saddle | 66.739 | 17.63 | 0.8990 | 3.4033 |
| 2. | 40 | PV8S020 | 2 in. | Saddle | 54.700 | 14.45 | 1.0969 | 4.1522 |
| 3. | 80 | PV8S025 | 2.5 in. | Saddle | 42.994 | 11.36 | 1.3955 | 5.2817 |
| 4. | 40 | PV8S025 | 2.5 in. | Saddle | 37.159 | 9.82 | 1.6147 | 6.1100 |
| 5. | 80 | PV8S030 | 3 in. | Saddle | 26.652 | 7.04 | 2.2512 | 8.5227 |
| 6. | 40 | PV8S030 | 3 in. | Saddle | 23.697 | 6.26 | 2.5320 | 9.5847 |
| 7. | 80 | PV8S040 | 4 in. | Saddle | 15.006 | 3.96 | 3.9984 | 15.1515 |
| 8. | 40 | PV8S040 | 4 in. | Saddle | 13.456 | 3.56 | 4.4590 | 16.8539 |
| 9. | 80 | PV8S060 | 6 in. | Saddle | 8.325 | 2.20 | 7.2072 | 27.2727 |
| 10. | 40 | PV8S060 | 6 in. | Saddle | 7.459 | 1.97 | 8.0440 | 30.4569 |
| 11. | 80 | PV8S080 | 8 in. | Saddle | 5.016 | 1.33 | 11.9617 | 45.1128 |
| 12. | 40 | PV8S080 | 8 in. | Saddle | 4.529 | 1.20 | 13.2480 | 50.0000 |
| 13. | 80 | PV8T005 | 0.5 in. | Tee | 991.706 | 262.01 | 0.0605 | 0.2290 |
| 14. | 80 | PV8T007 | 0.5 in. | Tee | 545.142 | 144.03 | 0.1101 | 0.4166 |
| 15. | 80 | PV8T010 | 1 in. | Tee | 352.435 | 93.11 | 0.1702 | 0.6444 |
| 16. | 80 | PV8T012 | 1.25 in. | Tee | 177.184 | 46.81 | 0.3386 | 1.2818 |
| 17. | 80 | PV8T015 | 1.5 in. | Tee | 117.852 | 31.14 | 0.5091 | 1.9268 |
| 18. | 80 | PV8T020 | 2 in. | Tee | 66.739 | 17.63 | 0.8990 | 3.4033 |
| 19. | 80 | PV8T025 | 2.5 in. | Tee | 42.994 | 11.36 | 1.3955 | 5.2817 |
| 20. | 80 | PV8T030 | 3 in. | Tee | 26.652 | 7.04 | 2.2512 | 8.5227 |
| 21. | 80 | PV8T040 | 4 in. | Tee | 15.006 | 3.96 | 3.9984 | 15.1515 |

INTEGRATED SAP FLOW MONITORING, DATA LOGGING, AUTOMATIC IRRIGATION CONTROL SCHEDULING SYSTEM

RELATED APPLICATIONS

This application claims priority based upon Provisional U.S. Application Ser. No. 60/517,984 filed Nov. 6, 2003.

BACKGROUND OF THE INVENTION

The present invention relates to sap flow, and more particularly relates to an integrated system for monitoring sap flow in a field and simultaneously performing data-logging and automatically scheduling irrigation therein.

As will be appreciated by those skilled in the art, water use is a crucial consideration worldwide, particularly in regions where water is scarce such as in arid climates and the like. Water consumption is, of course, of profound interest to practitioners engaged in viticulture. In view of the growing popularity of wines, it will be readily appreciated that the extent and frequency of irrigation and concomitant stress imposed upon grapes has been found to affect the quality thereof, and, ultimately, upon the quality of wine derived therefrom. There have been many approaches applied to deal with the phenomenon of stressed-plants.

What has previously been commonly regarded as evaporation transpiration, referred to as "ETP," has now evolved into a panoply of phenomena including exposure to the sun, temperature, relative humidity, and wind speed, referred to as "ETO." Using the crop water stress index ("CWSI") has been found to be convenient for ascertaining the logistics associated with plant-stressing, wherein a zero CWSI value represents a well-watered, healthy plant. It will be understood that viticulturists generally control stress via deficit irrigation techniques. In the art, irrigation-scheduling has traditionally flowed from irrigation techniques based on timers, ETP-related modification of schedules, conducting soil moisture surveys, and, of course, time-tested heuristics. Such classical irrigation procedures have focused upon target markets that implicate commercial irrigation of crops, viticulture, orchards, oranges, apples, and stone fruit.

By continuously reporting the hourly water use rate of a tree, vine, or crop, a sap flow gage can record any change in the daily pattern of transpiration that reveals a shortage of water and the need for replenishing soil moisture supply. As an example, referring to FIG. 5, there is seen the sap flow of two trees, a peach and a pecan planted in lysimeters, compared with calculated demand. The trees were well-watered before the test, but sap flow was unable to keep up with demand. The peach tree sap flow declined 26% by the third day when faced with steady demand, thereby experiencing a water deficit. The water stress index may be easily calculated for plants having the same demand defined by the ETP, or by direct comparison of a well-watered plant (Tww) and a stressed plant (Tstr). The stress index for peach tree on the third day compared to the first day is therefore:

$$CWSI=1-Tstr/Tww=1-60/81.3=0.26$$

Using this convention, the tree with a stress index of zero has no transpiration drop; and the tree having a stress index of one is not transpiring. The crop stress index can be applied to any type of stress for heat, disease, pollution, or any other environmental factor. It should be evident to those skilled in the art that, when working with orchards or field crops, this information is invaluable since it is not directly obtainable in any other way.

As depicted in FIG. 6, Dynagages have a soft foam collar that surrounds its electronics. A Dynagage is installed on a stem having an axial length of at least the gage height, which is cleared of branches and smoothed. A weather shield is installed for outdoor applications and radiation shielding. O-rings are installed so as to allow enough room for an O-ring height above and the same distance below the gage. The specification for the gage diameter is the determining factor for selection of a gage, which fits properly. A worker in the field finds the diameter of the plants to be tested with a girth tape, or other measurement of the circumference. Then, this is converted into its diameter and the table of stem diameter ranges is checked. Choosing a gage that is the typical size or close to the minimum size has been found to provide ample room for plant growth. The sensor can also be moved higher on the stem to fit a smaller diameter, or moved lower to fit a larger diameter. An insulation wedge can be obtained to fill the gap when expanding the gage to its maximum diameter limit.

It will be appreciated that there are two data filters advised for general logger programs to check the quality of the underlying data, and to reject flow computations at periods when the sensor signals are either below the minimum threshold or above the maximum flow capacity of the sensor. The low flow rate filter takes care of the initial conditions where dT approaches zero, or less than zero, and it can also flag the user when a negative heat convection carried by the sap ("$Q_f$") is computed, in the instance of a thermal conductance constant for a particular installed sap flow gage ("$K_{sh}$") setting not being made at its minimum value. Generally, the real-time filtering should be performed by the high capability loggers with the computational and logic capacity needed. With basic loggers, the logic and filtering should be performed afterwards. When the vertical and radial heat fluxes are subtracted from the power input, $Q_f$ is the remaining power carried by the sap. In the case of a zero flow rate on a very small stem, the temperature increases as dT approaches zero. For these cases the flow may be grossly exaggerated with a minor residual $Q_f$. It will be understood that a true zero flow rate with accompanying dT of zero is rarely noticed on large plants, trees, or crop plants in a natural, growing condition. It will be appreciated that it takes only 3-4 grams per hour water flow to cause a positive dT on a 16 mm diameter plant.

Accordingly, these limitations and disadvantages of the prior art are overcome with the present invention, wherein a computer system is provided for monitoring sap flow in a field and simultaneously performing data-logging and automatically scheduling irrigation therein.

SUMMARY OF THE INVENTION

The present invention provides a comprehensive and integrated irrigation and water-balance logging computerized system that measures plant transpiration, rainfall, and soil moisture; and that concomitantly provides a user-friendly graphical user interface ("GUI") that enables users to avail themselves of a plethora of parameters that feature interaction with a plurality of hardware components and sensors, via software. FIG. 1 depicts a simplified flow chart of the closed-loop control of the preferred embodiment of the present invention. As will be hereinafter described, water is monitored preferably in a plurality of plant irrigation zones preferably via four Dynagage sap flow sensors or the like which inherently provide expert weighted averages.

It will be understood by those skilled in the art that a Dynagage sap flow device is a precision thermodynamic electronic sensor that measures water flow rates and accumulated totals over time; sensor specifications and power requirements will be hereinafter elucidated. FIG. 4 depicts a frontal view of control panel with cover removed that coordinates the plurality of functions performed by the preferred embodiment. As is known in the art, collar enclosing electronics is placed around any smoothed and well-defined plant stem as long as the diameter fits within the ranges specified in the relevant mechanical data for each gauge. The variety of applications and species may dictate adjustments and close-monitoring of instrument signals while simultaneously verifying that proper operation is being effectuated. Those skilled in the art should be conversant with the theory underlying the operation of a Dynagage sensor and the concomitant plant thermodynamics contemplated by the present invention.

As with any other precise measuring instrument, correct installation technique is preferable and, indeed, essential for assuring that accurate measurements are taken. It will be readily appreciated that sensor maintenance, including fault-diagnosis, are also predicates for assuring that reliable and accurate results are obtained. Clearly, achieving this predicate will tend to diminish possible errors. Weekly maintenance in the form of checking each of integrity of gauge-stem contact, rapid crop plant growth, and sap accumulation, is also preferable and promotes a user obtaining acceptable results as contemplated hereunder.

It should be evident that proper installation of enclosures, cables, and software is crucial for effective operation of a FLOW4 logger embodiment. In order to perform the sap flow monitoring process contemplated by the present invention, procedures associated with data-logger connections, field installation, solar panel initialization, and setting voltage to the sensors have been developed and should be understood. The installation and start-up of logger software for obtaining real time sap flow results taught by the present invention will be hereinafter elucidated. This start-up includes establishing sampling periods, powering-down of the plurality of sensors, plant and stem gauge parameters, and establishing initial $K_{sh}$ setting. It will be understood by those skilled in the art that zero-setting, i.e., setting the $K_{sh}$ value, is prerequisite for real-time sap flow computations.

FIG. 2 depicts a typical screen display for user interface of the preferred embodiment of the present invention. Pertinent considerations include downloading the control program, data retrieval processes, and graphic results. Still other considerations include general data retrieval, reporting, and analysis. The present invention contemplates that sap flow may be conveniently recalculated from raw data with dT being interpreted; temperature signals and sap flow being analyzed based upon these recorded and reported results.

"Dynagage" sap flow gauges described herein are manufactured by Dynamax of Houston, Texas. Dynagage sizes ranging from SGA2 to SGA5 are called "microsensors." Gauges configured from 9 mm through 24 mm are termed "stem-flow gauges." Even larger sizes configured from 35 mm to 150 mm are referred to as "trunk-flow gauges." As will be understood by those skilled in the art, the fundamental operation of each of these sap flow gauges is substantially the same.

FIG. 3 depicts a frontal view of a housing of a representative Dynagage and a plurality of components configured for being interconnecting with plants and the like, and for measuring sap flow thereof. The sensor has characteristics which are recorded simultaneously with plant data in order to be converted into an accurate mass flow rate record. Assembling any system with a plurality of Dynagages has the same initial objective: to easily view and analyze transpiration pattern comparatively vis a vis the environment, and then to take appropriate actions as a function thereof. FIG. 5 shows an example of sap flow per hour compared with radiation over a three-day time horizon. Then, the sap flow accumulated for each day determines the minimum amount of irrigation-water that should preferably be replenished.

After this sap flow data is accumulated, it will be seen that the quality and concomitant analysis thereof is an aspect of the present invention. In the preferred embodiment, filters are invoked in software, e.g., in a conventional computerized spreadsheet, to automatically sieve-out unusable data that is out-of-range. Under the present invention, depending upon the logger system and related data retrieved for analysis, the flow rates and accumulated totals thereof may be compared to environmental data or, alternatively, compared to accumulated plant data—either within the same data-logger or on other data-loggers.

Embodiments of the present invention have been implemented so that historical data may be conveniently accessed via a custom-tailored menu-driven software graphical interface ("GUI"). Such embodiments automatically factor both the number of plants per field and the plurality of plant sizes into the underlying calculations—and concomitant system responses and adjustments. Accordingly, Irrigation is adjusted to enable users to appropriately deal with system inefficiencies and evaporation. Also provided is a conventional PC communications interface compatible with any available operating platform, e.g., Microsoft Windows-based, linux-based, etc.

Ergo, the present invention provides a means for collecting irrigation-related data ("DL" functionality) and irrigation scheduling and control ("IS" functionality). Embodiments of the present invention comprise a plurality of Dynagage sap flow sensors or the like that focus upon stem area and sensor-specific heat measurement. It should be understood that companion stem flow gauges describe sensor parameters for each plant being measured. Voltage control may be set either automatically or manually. It should be appreciated that data-logging is a normal function that affords a history of irrigation-water needed and irrigation-water applied, ascertained via water-balance calculations. This history is, of course, useful for recording and reviewing system performance and consequent crop production.

It will also be understood that the present invention enables irrigation to be automatically controlled based upon water-balance calculations and by displaying irrigation status over the applicable time horizon. It should be evident that irrigation valves may be controlled either electronically or manually. Furthermore, water meter valves enable the extent of water-passage therethrough to be ascertained by tracking pulse-clicks per liter or the like. Water inputs are measured via reservoir and sap flow which indicate how much water has been consumed. Irrigation methods include periodically scheduling field-application in days or hours; plant density—number of plants in a field; hectore describing plants—plant-based irrigation; green house—number of plants; and irrigation efficiency which includes evaporation. Additionally, it should be appreciated that deficit-irrigation may be implemented as appropriate.

Similarly, embodiments of the present invention contemplate that indexing may be achieved by field, stem, and leaf in order to enable average irrigation per plant to be calculated preferably via water-balance. It should be understood that this methodology enables the user to readily determine the quantity of water needed to replenish all consumed water—either as a surplus or as a deficit.

An advantage and feature of the present invention is that the functions contemplated hereunder may be effectuated whether or not a PC is attached. Accordingly, history may be saved and retrieved via the Logger function. It will also be appreciated by those skilled in the art that embodiments of the present invention teach a voting function wherein anomalous or out-of-line sensed data is omitted or filtered-out to promote accuracy of results. It should be obvious that this voting aspect inherently assures a fail-safe procedure for discarding bad data so that irrigation logging and scheduling does not suffer from costly errors and the like.

These and other objects and features of the present invention will become apparent from the following detailed description, wherein reference is made to illustrative examples and related tables, and to the figures in the accompanying drawings.

IN THE DRAWINGS

FIG. 9 depicts a solar panel power calculator spreadsheet.

FIG. 18 depicts the Stem Flow Gage dialog box of the preferred embodiment.

FIG. 19 depicts the Automatic Irrigation dialog box of the preferred embodiment.

FIG. 24 depicts a tabulation of K-Factor of the preferred embodiment.

DETAILED DESCRIPTION

Figure 1:
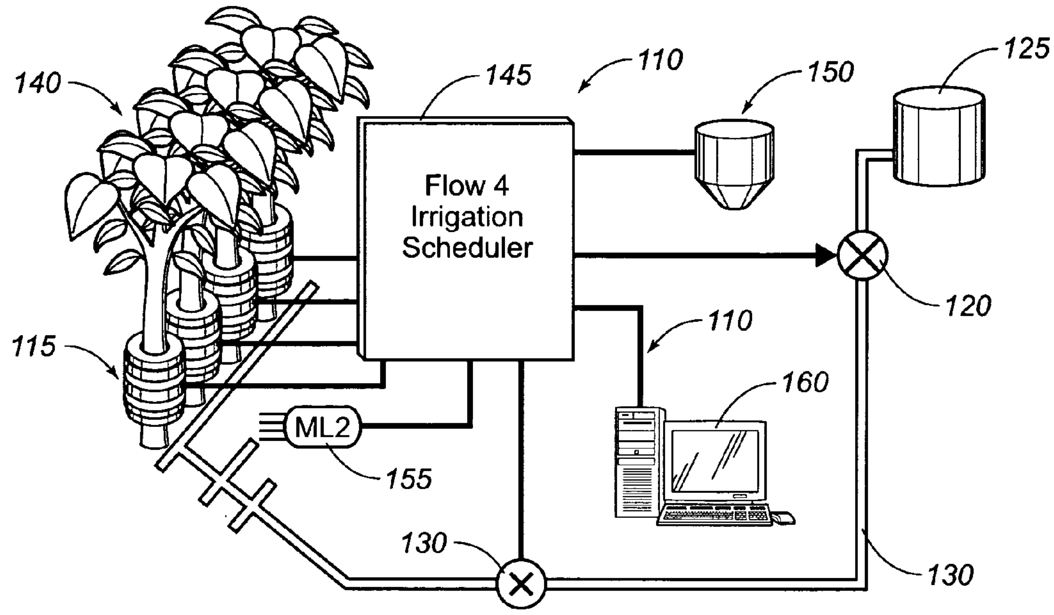
FIG. 1 depicts a simplified flow chart of the closed loop control of the preferred embodiment of the present invention.

Embodiments of the system contemplated by the present invention constitute an integrated system for monitoring sap flow and simultaneously performing data-logging and automatically scheduling irrigation in the field. The system taught by the present invention comprises a plurality of in situ sap flow gauges that perform comprehensive computer-controlled tasks in a field being irrigated.

This plurality of sap flow gauges can be easily detached and reinstalled/reattached as appropriate. As will become apparent to those skilled in the art, a scaling mechanism is used to calculate crop water usage in variously-sized fields. Preferably included in the system taught by the present invention is an integrated portable computer apparatus which is programmed to perform a plurality of actions, including a controller for sap flow monitoring and automatic irrigation scheduling; and data-logging for monitoring sap flow pursuant to irrigation scheduling. The instant system preferably also comprises a plurality of Dynagage sap flow gauges, an automatic rain gauge, a water meter, an irrigation valve actuator, and a plurality of auxiliary and independent weather and/or soil monitoring sensors.

Dynagages contemplated hereunder afford novel electronic sensing methodology with three output channels per sensing device; the disclosures pertaining to this electronic sensing methodology is recited in U.S. Pat. Nos. 5,337,604 and 5,269,183; and are incorporated herein by reference. As is well known in the art, stem-flow gauges produced by Dynamax Inc. of Houston, Tex., are state-of-the-art tools for measuring sap-flow in herbaceous plants and trees. Indeed, Dynagages are precision instruments that sense milli-watt power transfers from a heater strip to the ambient, to plant stems, and into sap flow. It will be appreciated that sap flow cools off the heater in varying amounts, thereby corresponding to the flow rate.

It will also be understood that Dynagage transducers use high durability insulation/dielectric materials and proprietary heater designs which assure a durable and reliable product for field applications. Two Dynagages' readings from signal temperature differences above and below the heater and concurrently measure the conducted stem heat transfer. A third reading from a Dynagage sensor measures radial heat flux, the heat lost to the ambient, from a thermopile, the set of junctions placed in series alternately adjacent to the heater, and on the outside surface of a thin cork annulus. It is also understood in the art that the energy-balance method also requires monitoring the voltage to the heater so that constant energy input to the stem section is known with precision. Thus, a total of four data-logger channels are required to monitor all of the signals pertaining to sap flow computations. Each data-logger channel preferably has a resolution and accuracy of +/−0.33 uV; however, it has been found that loggers having an accuracy of 1.0 uV frequently provide satisfactory results.

For a user to initialize control and monitoring procedures, system components should preferably be interconnected with a PC via standard serial cable or the like; prerequisite inputs are effectuated via a user-friendly graphical user interface ("GUI") that has been custom-developed in software. As will be appreciated by those skilled in the art, the computer apparatus contemplated hereunder should preferably be mounted in a weatherproof enclosure that may be powered by rechargeable battery, solar panel, or, alternatively, by AC mains power with battery backup. At a suitable interval set by the user, irrigation is automatically triggered in order to balance transpiration losses, based upon calculations that ascertain prerequisite water of sufficient depth or volume being pumped therethrough.

Referring now to FIG. 1, there is seen a simplified flow chart of closed loop control 105 of the preferred embodiment of the present invention. As shown, the preferred embodiment comprises four sap flow Dynagages, and is accordingly referred to as "FLOW4" herein. Controller apparatus 110 invoked in FLOW4 preferably comprises a dedicated Motorola microprocessor or the like, and a computer program prerequisite for control and real-time sap flow calculations preferably implemented in EEPROM memory. Outputs from each stem gauge 115 are verified, processed, and expressed as rate of transpiration in depth of water per unit of time or volume of water per unit of time. At any interval set by the user, the depth or volume of water is calculated—by controller apparatus 110—that is required to pump in order to balance transpiration losses accounting for inefficiencies in distribution. FLOW4 then automatically triggers irrigation valve 120 that is situated either in the "ON" or "OFF" position, thereby allowing water from tank 125 to flow through pipes 130 across flow meter 135 to plants 140.

It should be evident that the present invention teaches a system having closed loop control with irrigation-driven water flow from soil through plant to atmosphere—and with a feedback loop. It will be appreciated that FLOW4 performance is gauged by a plurality of sensors and measuring devices. Ergo, FLOW4 comprises a system of automated irrigation that uses water efficiently and, accordingly, is inherently efficient regarding water conservation and even water conservation studies.

Another aspect of the present invention is irrigation scheduler 145 which preferably corresponds to a stand-alone water-balance measurement system for irrigation-automation as a function of plant transpiration. Four dynagage sap flow sensors 115 read crop-water consumption with concomitant recorded measurements being compared with rainfall. Rainfall is measured by rain gauge 150; soil moisture is measured by moisture sensor 155; and irrigation is measured by flow meter 135. Water balance or water deficit then determines the amount of water to be replenished at a predetermined interval. As a consequence, embodiments of the system contemplated hereunder may inform a user/grower to manually apply a specific water volume for the area intended, or may automatically cause irrigation valves 120 to open and remain open until the water-balance is replenished.

Yet another aspect of the present invention is an inbuilt logger, contained within control apparatus 110, that collects sap flow data—rates, rainfall, and irrigation history—for future retrieval by PC 160 or remote radio link. As will become apparent to practitioners in the art, using the panoply of integrated features taught herein enables water-efficient crop management to be easily and precisely achieved in a manner heretofore unknown in the art.

The data logger aspect of FLOW4 provides water-balance measurements for data-logging and plant-monitoring purposes. Four Dynagage sap flow sensors 115 are preferably recorded with all sensor signals, sap flow, and weighted-average for four plants. Optional sensors 150 and 155 for rainfall, soil moisture, or solar radiation are recorded at each logging interval. This FLOW4 data-logger stores the irrigation and watering history for direct or remote retrievals. When PC 160 is interconnected with the data-logger, the detailed log of sensor results may be transferred to a PC 160 for analysis, preferably in the form of spreadsheet files, e.g, Microsoft Excel, Lotus 1-2-3, Corel Quattro Pro—or other software applications which can perform the same or similar functions thereon.

Embodiments of the present invention include software that enables users to easily install and configure FLOW4. Thus, through a conventional point-and-click protocol, users simply point to an appropriate icon on desktop 200 depicted in FIG. 2, and then click thereon to initiate the function represented by the icon. It should be appreciated that each plant sensor depiction 215 preferably affords automatic diagnostics—with check marks and status codes 220—to indicate the current status of the Dynagage sap flow apparatus. By clicking on "setup" menu option 225, the menu choices are graphically displayed.

Figure 2:
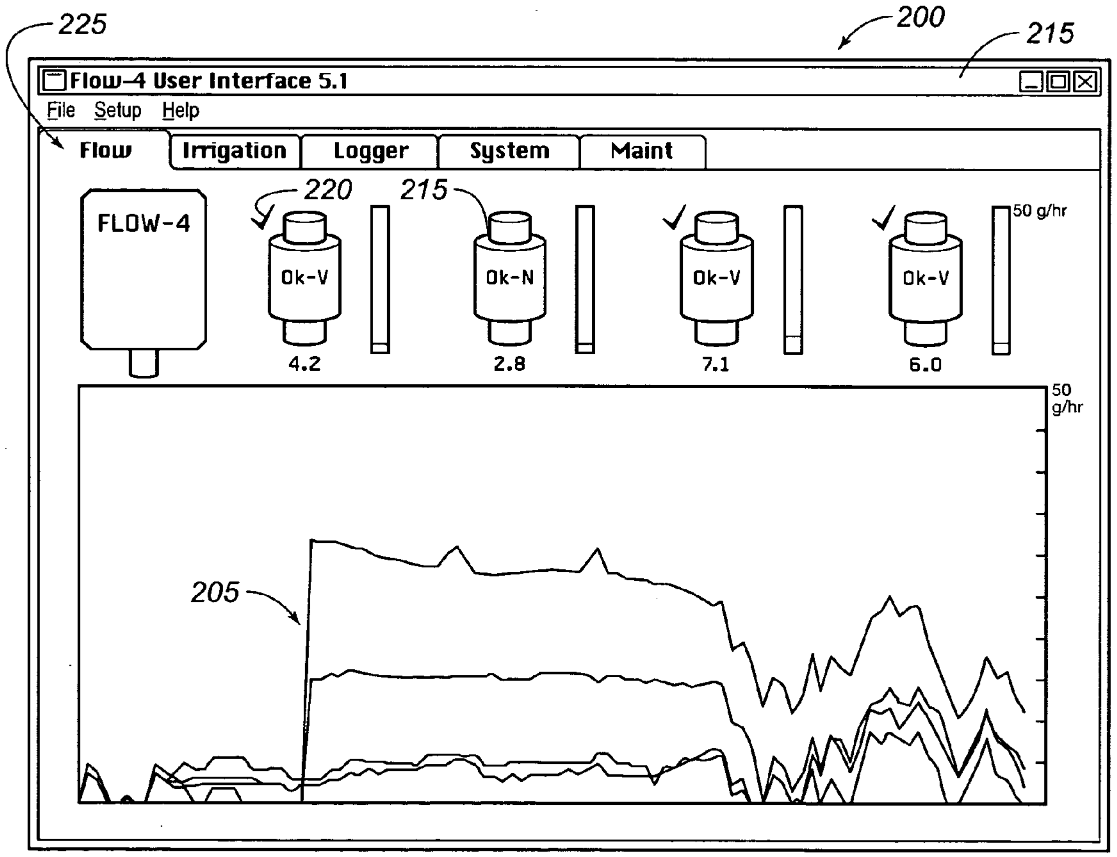
FIG. 2 depicts a typical screen display for the user interface of the preferred embodiment of the present invention.

Still referring to FIG. 2, there is depicted typical screen display 200 for the GUI aspect of FLOW4, the preferred embodiment of the present invention. After setup is complete, the preferable procedure is for the user to disconnect the PC, and then FLOW4 does the rest. For instance, by direct communication to FLOW4 in greenhouses and with remote radio modem, the software of the present invention can display plant flow rates, rain, total irrigation, and water-balance not only via graphs 205, but also via bar charts or the like. Separate menus 210 preferably adjust crop-field description, logger settings, and show overall system status. It will be readily appreciated by those skilled in the art that no other heretofore known sap flow-related apparatus and concomitant methodology affords such a panoply of unique features integrated into a single system.

The following enumerates typical data logger specifications for the preferred embodiment:

Proprietary embedded microprocessor preferably operating at 8 MHz;

27 KB of data storage;

4 KB non-volatile memory;

28 KB program memory;

Sensor inputs comprising:

4 Dynagage sap flow sensors 12 differential inputs: range +/−2.5 mV, 0.1 uV res.

4 inputs: range 0-10 V, 1.0 mV res.;

Auxiliary sensor: range 0-2.5 V, 0.1 mV res.;

Rain gauge: dry contact closure;

Flow meter: dry contact or solid state 0-12 V., 7 KHz maximum pulse rate.

All inputs are over-voltage and surge-protected against lightning. For each sensor cable there are 8 conductors, 15 ft (Dynagage); all external inputs are preferably provided with connectors. Control Output for Irrigation Scheduler preferably only comprises a valve control relay, 15 A @28 Vac maximum; communication port preferably with RS-232 connection for 9600 Baud and having preferably a 15 ft. cable; an AC outlet adapter comprising a switching regulator with 4 A @15 V DC; 120/240 Vac, 50-60 Hz. with 6 ft.

extension cable; battery power with voltage requirements including sealed lead-acid, 12 V, 5 Ah, with working range 10-15 V; absolute minimum of −6 V to sustain logger memory backup. System current is preferably 80 mA without sensors, 140 mA with two SGC16 maximum fuse current 3.15 A, 250V, (5×20 mm). Preferred enclosure dimensions are 13.56"×11.43"×5.21" (34.4 cm×29.1 cm×13.2 cm) and preferred enclosure weight is 15 lbs. (7 kg). Associated ratings are NEMA 1, 2, 3 rain tight; CSA, UL Listed.

Figure 3:
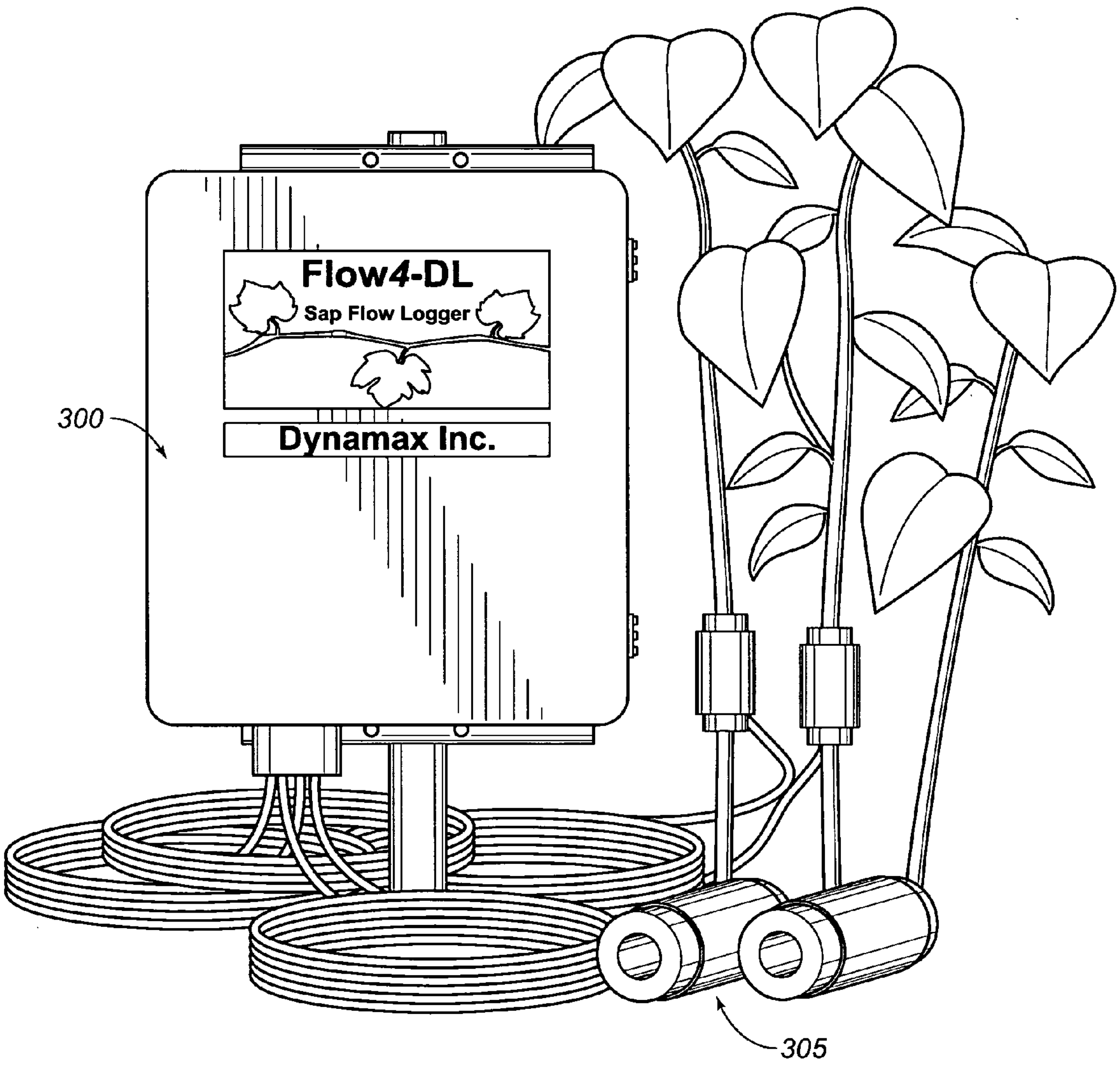
FIG. 3 depicts a frontal view of a Dynagage housing and its components for interconnecting with plants and the like, for measuring the sap flow thereof.
Figure 4:
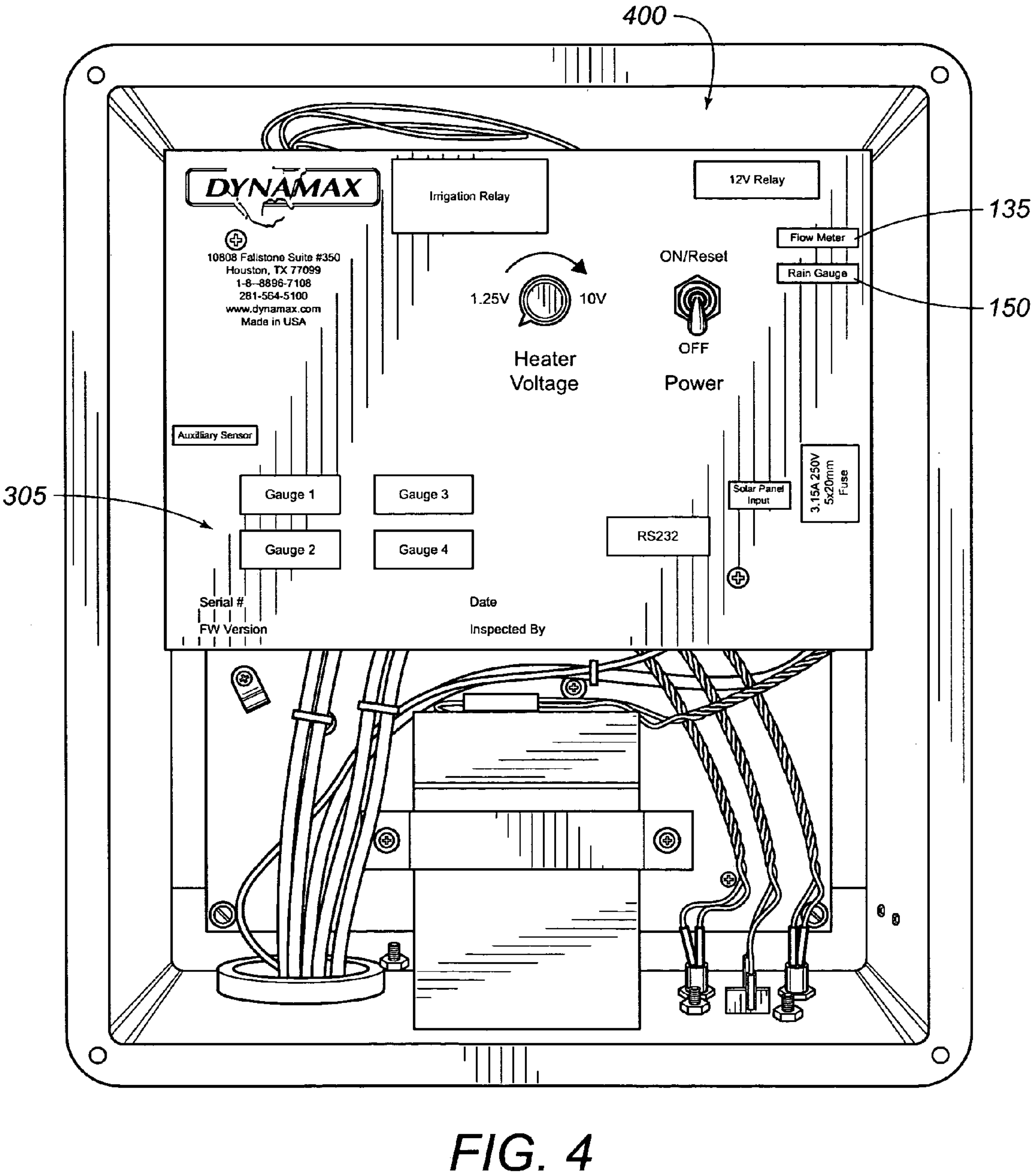
FIG. 4 depicts a frontal view of control panel of the preferred embodiment, with the cover removed.
Figure 5:
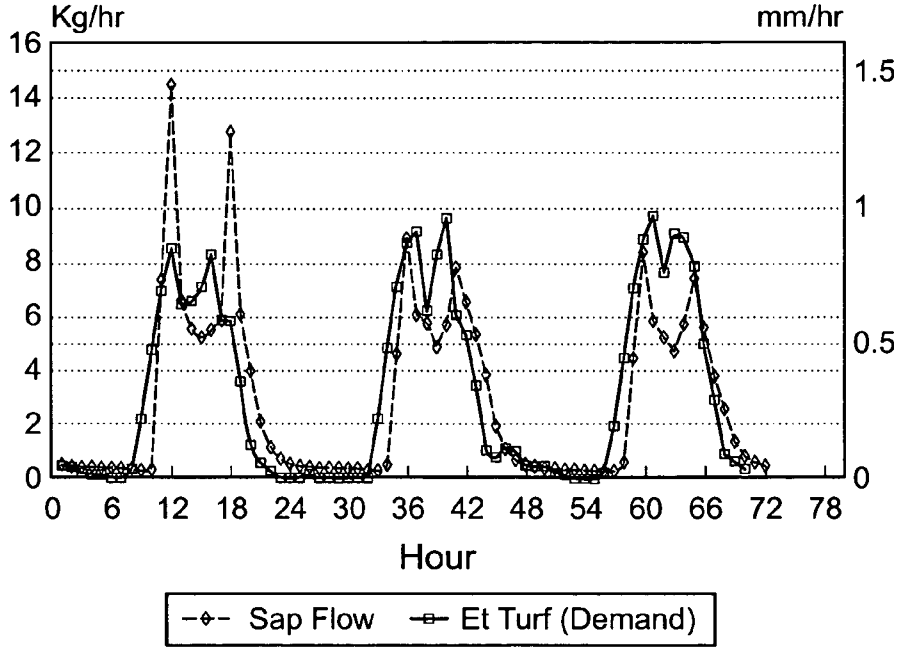
FIG. 5 depicts a plot of peach tree water consumed vs. evaporation transpiration showing sap flow per hour.
Figure 6:
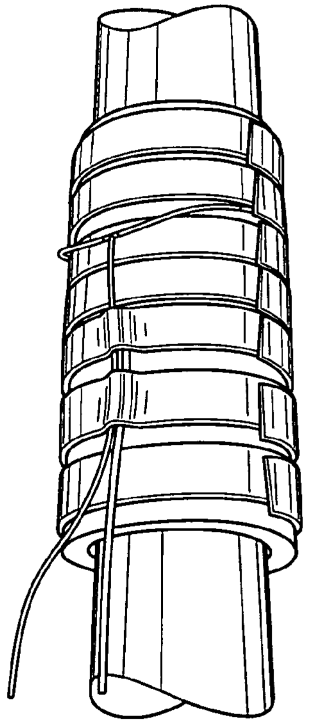
FIG. 6 depicts a frontal perspective view of an in situ Dynagage.

Now referring collectively to FIGS. 3 and 4, there is depicted in FIG. 3 features of FLOW4 data logger 300, and there is depicted in FIG. 4 features of irrigation control system 400. In particular, the preferred embodiment comprises high-performance irrigation and water-balance logging; measuring plant transpiration, rainfall, and soil moisture; monitoring water applied to crop irrigation zones; ascertaining expert weighted averages from preferably four Dynagage sensors 305; easily accessing historical data via intuitive, user-friendly menu-driven software; establishing number of plants per field, with plant size automatically being factored; adjusting irrigation to compensate for system inefficiencies and evaporation; interfacing communications to any suitably configured PC. It will be understood that such PC may be Windows-based, Linux-based, or the like. Under preferred embodiment (FLOW4), features specific to data logger 300 comprise 12,250 records covering 14 days of hourly logs; daily water-balance log for up to 1 year; automatic zero without necessary calibration; convenient portability; optional solar power; sensor range 5-50 mm (2") diameter; battery backup; and fail-safe memory.

According to the present invention, sap flow can be computed and saved on a grams per hour basis or on a per day basis via a suitable formula functionally related to the heat applied to the stem, radial energy obtained from the stem, and temperature differences of sap above and below the strip heater. It will be appreciated that the stem flow gauge has the following features: directly measures water use; portable and reusable; non-invasive and non-intrusive; flexible collar straps configured to circumscribe the plant stem; stem flow gauge models adapted to fit stem diameters from 2-150 mm (0.1"-6"); low time constant; no calibration required; absolute mass flow computation; +/−10% typical accuracy; self contained data-loggers for real-time displays; low power requirement; outdoor weather shields; software support on portable PC—under preferred embodiments, under a Windows 95, 98, NT, or XP platform.

It should be appreciated by those skilled in the art that users who need transpiration information will complement soil moisture depletion data by preferably invoking a plurality of Dynagages or the like. It will also be understood that plant growth models that simulate water use from meteorological data can be derived and accurately constructed with the benefit of quality sap flow data. Of course, as is known by practitioners in the art, leaf porometer readings and micrometeorological instruments are inadequate substitutes for direct readouts of plant water flux, using an appropriate Dynagage or the like. As long as the plurality of plants have stems in the available Dynagage size ranges, then primary data may be collected using a corresponding number of Dynagages. This enables the transpiration of an entire crop to be readily and accurately computed.

Other benefits are that the FLOW4 System simplifies water consumption easy and renders it inexpensive to record; usable from one season to the next; usable on a plurality of species; harmless to the plant; allows for plant growth; allows daily expansions and contractions; provides sensors for crops, shrubs, ornamentals, trees; applicable to dicots and monocots; monitors plant reactions to rapid environmental changes; installs simply and expeditiously via a user-friendly GUI; invoking auto-zero software, enables $K_{sh}$-based adjustments on expert software analysis; accurately predicts water needs; affords confidence in statistical data; results available in real-time; decision-making based upon current information; optional power provided by solar panels and/or batteries; affords reliable outdoor operation; handles water spray and rains; enables expedited generation of results and related setup via Dynamax Flow32 system or the like, and concomitant graphical analysis.

Figure 7:
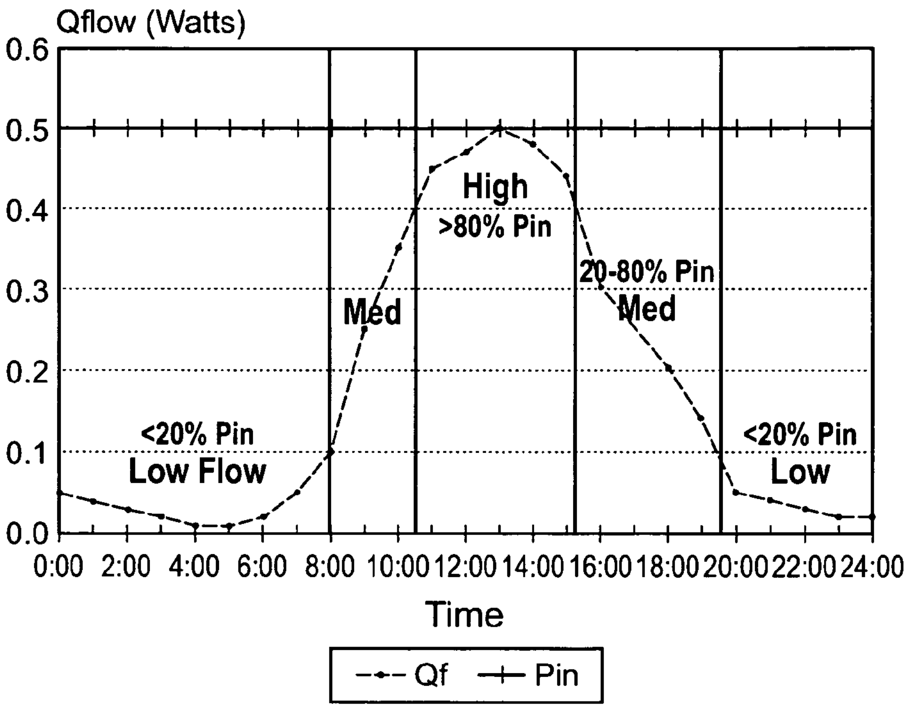
FIG. 7 depicts a plot of low, medium, and high flow rates representing watts per time.

Referring to the low, medium, and high flow rates depicted in FIG. 7, to make proper use of the accumulator at low flow rates, the underlying algorithm tests comprise the following:

If $0 <= Qf < 20\%$ Pin and if $dT < dTMIN$ i.e., dTMIN=0.75 C in a normal program default), then F is set to zero.

However, it should be noted that:

dTMIN=1.0 C to 1.2 C for large trees or plants that use water at night.

dTMIN=1.5 C for Dynagages SGA2 and SGA3 sensors that have the built-in positive temperature offset.

It has been found in studies of small stems that dT may be negative during the evening and may be at near zero for an entire evening. Accordingly, negative and distorted flow rates are screened out using the first filter procedure. The second phase of this filter is:

If $Qf<0$, then $F$ is set to =−0.00001 g/s, or −0.036 g/h, ($CR10X$ based systems).

It will be understood that forcing −0.036 g/h into the flow rate output provides a convenient flag value to be noted by the user. A flag is then set for a condition when it is necessary to inspect the data for reevaluation of the $K_{sh}$ setting. $K_{sh}$ may not be set perfectly, and it is possible that a negative residual $Q_f$ is computed, especially after sundown when a loss of heat storage is interpreted as a negative $Q_f$ for a few hours.

Thus, by using the second phase of the low flow filter, the disruption of the accumulator is avoided. Minor negative excursions in $Q_f$ are possible in circumstances of released heat storage in the stem and the gauge jacket. During the evening hours when the heat storage is negative, caused by the ambient and gauge dropping in temperature, a negative $Q_f$ is commonly noted for a few hours after sunset. However, these effects are normally of short duration and typically do not affect overall Dynagage performance. It will be understood by those skilled in the art that temperature increase of the sap is a concern when flow rates are very large; there is a hyperbolic dependence between flow rate and the temperature difference dT.

Since the minimum temperature corresponds to the maximum flow rate, the practical limitation of high flow rate is computed from an analysis of instrument sensitivity and an estimate of the practical limits of thermal noise. Maximum gauge flow rate can be determined by a signal analysis that compares the maximum output error due to the expected limits of input error for various situations, and then by checking the maximum error against accuracy goals. In this manner, a user can construct tighter or looser goals depending upon the particular species or circumstances of operation. According to teachings of the present invention, the analysis program support may then be adjusted to fit the specific situation.

The assumption of thermal sensing error in the sensors is that dT can be measured with about 0.1° C. accuracy, and the accuracy of the datalogger is assumed to be no less than +/−1 microvolt; this corresponds to a 0.025° C. error. For error analysis, the +/−dT of 0.1° C. is superimposed on dT, and then the potential error can be expressed as a % of the total flow rate. As will be appreciated by practitioners in the art, if the potential error is over 30%, the flow data is judged to be unacceptable. The user may follow a procedure of disconnecting one of the power leads to a sensor on a plant in the field, and then keep the sensor attached to the logger while "passive" dT and thermopile readings are measured for a typical day's operation. If there is very large dT variation due to ambient temperature gradient where the sensor is installed, it can be measured and recorded with the other active sensors. On the other hand, if a 0.25° C. or greater passive dT is noted, compared to a typical 1.0° C. reading on the active sensors, then there is a need to make adjustments in the sensor installation or the data set per se in order to make suitable gradient corrections.

Figure 8:
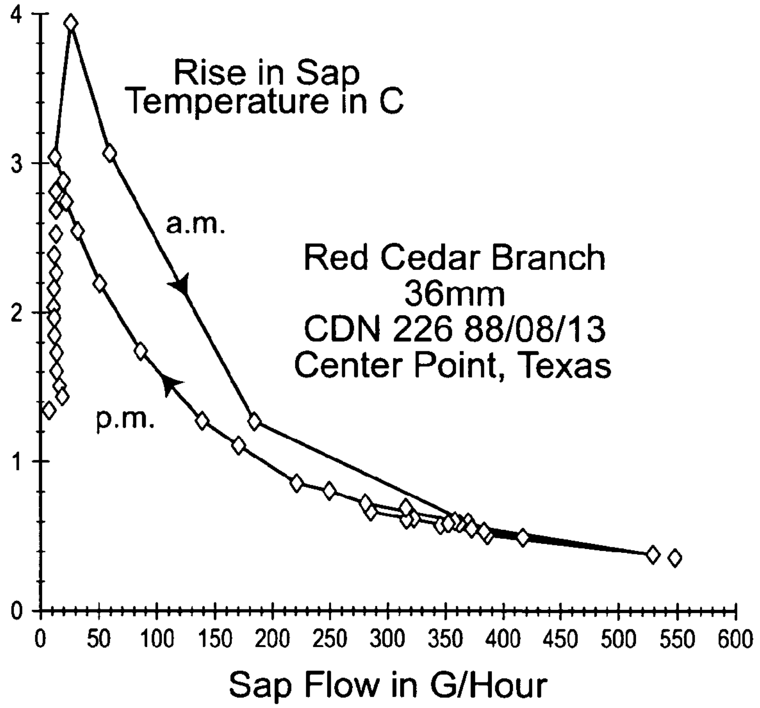
FIG. 8 depicts a plot of typical rise in sap temperature for a red cedar branch.

When the flow rate is exceptionally high, the Qv component becomes very low, the radial flux approaches zero, and the sap absorbs almost all of the heat. It has been observed that Qf greater than 80% of Pin characterizes these conditions. During conditions of Qf approaching Pin, the major determinant remaining variable is the temperature increase, dT. This is illustrated in FIG. 8 which depicts the rise in sap temperature. As the flow increases, dT asymptotically approaches zero, as the trend in the afternoon indicates. As dT becomes smaller with increasing flow rates, thermal noise from radiation or other effects can cause a major exaggeration in flow.

For example, if the maximum power absorbed by the sap shown in FIG. 8 was at a temperature increase of 0.10° C., instead of 0.35° C., due to a −0.25° C. error, the output of flow equation is 350% higher (0.35/0.10*F)—clearly exceeding a reliable flow-rate noise margin. Use of a high flow-rate filter prevents a distortion of the accumulated flow over those rates that are reasonable. It will be understood that an example of this accumulated flow distortion might be attributable to afternoon sun shining directly on trunk and gauge without a shield installed (i.e., not a planned or correct gauge use).

Since maximum sap velocity is a convenient description of the problem, the output for the high flow rate filter stops at a maximum calculated rate depending upon stem diameter entered into the cross-sectional area constant. A preset maximum velocity value of 0.042 cm/s, equivalent to a normalized sap velocity, i.e., vol flow rate/stem area, of 152 cm/hr, is multiplied by the area:

$$F\text{max}=V\text{max}*A$$

If F>Fmax, then the user should preferably set F=Fmax, and set overflow flag if available. In this example, the maximum flow in a 35 mm tree trunk (9.6 $cm^2$) is computed and compared to the calculated flow. If excessive, the accumulator integrates flow at a rate of 1451 g/hr, Fmax. It will be appreciated that flow of sap over this calculated value may be encountered for brief periods, but the integrity of the accumulator is sustained.

At dT values under about 0.24° C., an overflow condition is reached, corresponding to the maximum flow rate. The temperature stability of the Dynagage and the interconnections thereto can be assumed to be no better than +−0.1° C. Therefore, the flow rate errors at dT=0.24° C., +−0.1° C., could, indeed, be significant if it were not prevented by the high flow rate filter. Depending on the sap flow system, a flag may preferably be set by FLOW4 software to indicate a possible error condition.

To prevent thermal noise from becoming a large percentage of the measured signal, the user may increase the power to the heater. A 50% increase in power, corresponding to increasing voltage 22%, may be performed and tested to check the increase in dT at maximum flow. It will be comprehended by practitioners in the art that a second 50% increase may be necessary as the season progresses and leaf area increases. If the morning sap temperature increase exceeds a safe limit, i.e., in excess of 6-7° C., then the power-down mode available on most systems should be used to cut-off the heater power after sundown, and then to return the heater to an on-condition preferably an hour or two before sunrise.

Dynagages comprising embodiments of the present invention, as will readily be appreciated by those skilled in the art, are delicate piece of equipment and should be handled with care, particularly during installation and removal thereof. Plant stems should preferably be properly prepared prior to installation of a Dynagage. Thus, plant stems that will be measured using a plurality of Dynagages or the like should be properly prepared for sap flow monitoring to assure that the diameter is within the gauge's range. It has proven to be advantageous in the field to use a girth tape or caliper for obtaining reliable gauge readings. The user should preferably note the installed height in the mechanical specifications, measure the girth at the midpoint for the gauge position, record the diameter, and then figure the sectional area (in $cm^2$) for entry into the setup constant settings. The stems selected will be ideal if such stems are free from petioles, leaves, large scars, or other irregularities.

Generally, according to the teaching of the present invention, a few small branches or leaves should be removed by cutting petioles flush with an implicated stem. The gauge should not be situated until healing of the wound has occurred so as to prevent damage to the gauge from plant sap. Roughness in healed leaf scars and accumulations of naturally occurring dead bark are removed by very light sanding thereof with medium-fine sandpaper. It should be evident that any applied sanding should preferably be kept to a minimum. Species that have thin bark, i.e., bark less than 1 mm thick, require little or no sanding at all; species with thick layers of bark at least 2 mm may require more sanding. Sanding, of course, should not penetrate the live, green, cambium layer. As will be readily understood, crops and herbaceous plants seldom require sanding; indeed, sanding should preferably be avoided, if possible.

All Plants transpire to some degree though the stem thereof, especially well-watered maize. To prevent a constant accumulation of this condensed water from affecting gauge readings, the user should preferably wrap a layer of thin plastic around the stalk and then secure it in position using tape or the like. Then, the gauge should be installed over the plastic wrap layer to sustain "freshness" without adversely affecting overall performance. It has been ascertained from field tests that plastic products commonly used to wrap foods prior to being refrigerated, e.g., Saran Wrap, Glad Wrap, etc., adequately achieve the purposes contemplated herein.

Users of embodiments of the present invention should preferably understand the origin of thermal noise. In mornings, soil temperature exceeds air temperature, and may cause a (−) dT gradient in the sensor as warm sap enters a cooler stem. This gradient can cause temporary overestimates if the flow rate is high and the sensor is near the soil. In the afternoon, the ambient air is at a higher temperature than the soil, thereby causing downward heat flux. The sensor thus measures a higher dT due to a (+) dT gradient therein. It will be appreciated that the afternoon problem is less than the morning problem since the air temperature gradually falls in the afternoon while the air temperature gradually rises in the morning.

The temperature variation over a distance corresponds to dTg/dY, wherein distance dY is measured from the top to the bottom of the sensor cylinder. If this additional gradient (referred to herein as dTg) is superimposed on the sensing area, it may influence the dT readings either positively or negatively. Accordingly, in each setup of the system taught by the present invention, it is recommended that a user quantify the dTg at the time of initial data collection.

For actual field application, each sensors should be installed in the manner known in the art. Then, the AVR (D) switch should be turned off to stop power from being fed to the sensor. To select only a few sensors, the heater lead from the terminal block supplying power thereto may be disconnected. Then, the user should log the regular dT and sensor signals preferably for at least 24 hours. After inspecting the data, there will be fluctuations caused by combined effects of soil, water and air gradients. After an hour or more, dT measurements greater than +−0.25° C. should be noted and installation logistics addressed. If the dTg causes dT to become negative by more than 0.25° C. in the morning, up to −1.0° C., then it will be appreciated that the likely cause is that the sensor is too close to the ground.

It has been found that this conclusion assumes that the stem below the sensor is shaded and the sensor is properly fitted. If the negative gradient appears in the afternoon when the sun angle is disposed on the trunk, then a sensor mounted above the ground can cause heated sap to enter therein. This situation may be easily remedied by shading the trunk, and thereby equalizing sap temperature with the ambient preferably by using aluminum foil or the like.

When recording non-heated sensors, it should be noted that the ambient also causes radial heat flux—either negative or positive—depending upon whether the ambient is heating or cooling the trunk. Nevertheless, In both cases, Qr values are computed correctly with daily sap flow results, since the absolute heat flux is established with a $K_{sh}$ zero set factor during a thermally equilibrated predawn condition. That is, with a proper zero set value determined, radial heat exchange with environmentally induced gradients should be continuously and automatically assessed. This additional positive or negative heat transfer is therefore included in the energy balance equation. It has been observed that the same conclusion applies to small Qv fluctuations with non-heated sensors.

In very severe gradient environments, such as a greenhouse having little circulation compared to natural conditions, the gradient may be recorded by logging unheated sensors disposed on a plurality of plants, and adjusting the dT on heated sensors recorded simultaneously on a set of similar plants. It is known in the art that this procedure yields a 10% improvement in sap flow calculations when adjusting the dT with the gradient measurement on unheated plants. In this case, readings in the afternoon showed that unheated sensors had a positive 0.5° C. to 0.6° C. gradient. Thus, calculated sap flow was lower than if the gradient were removed. By subtracting the gradient from the dT recorded on heated sensors, and then recalculating sap flow, it was found that a high degree (r2=0.94) of hourly transpiration accuracy was obtained.

Research in the art has also confirmed the need for insulation by measuring the ambient gradients with unheated sensors. Practitioners in the art are aware that plants with shielded and insulated trunks do not appear to have significant problems; evidence indicates that DTg values from 0.1 to 0.25° C. are typically recorded. When insulation below a sensor was removed, however, the gradient appeared as a problem, with dTg measured at 0.5 to 0.6° C. Implicated plants were small koa trees (Acacia koa) with open canopies, and trunks periodically exposed to the sun. Similarly, it was noted that, when stem gauges were installed on plants with closed canopies, e.g., coffee (Coffea Arabica), corrections to dT were unnecessary because the gradient fluctuations were likely to be near zero.

It will be appreciated, that, after the sensitivity for noise is understood, the procedures for discovering and preventing error or noise sources become well defined. Precautions should preferably be taken by the user to prevent thermal noise, and to shield or remove electrical noise sources using proper grounding techniques. The recommended loggers are designed and tested to have low electrical noise within embodiments of the present invention.

It has been found to be easier to follow the checklist of the following items and to prepare each installation with all of these precautions, than to discover one by one that all of these noise sources are affecting readings and obviously causing a problem. This latter approach necessitates a user having to solve each problem on a piecemeal basis. All of the precautions possible should preferably be taken as hereinafter described. It will be evident to those skilled in the art that excluding outside heating from the sun and from large temperature gradients at the plant's base solves many of the potential problems with thermal noise. Clearly, solid and secure thermal contact is a primary concern, as is excluding water from the sensor.

The following user activities affect thermal action and results thereof: remove excess bark and clean the stem; wipe with clean rag to check; dirt and dead cork impede temperature-sensing; install weather shield O-rings and PVC shield; seal out moisture at O-ring and shield mating points using G4 silicone compound or pruning sealer wax; mount gauge temperature sensors away from scars, petiole nodes, graft marks; in large trees with short trunks, use branch-measurement to avoid ground-heating effects; perform weekly maintenance on gauge per maintenance schedule; when encountering moisture buildup from cuticular transpiration or high humidity, wrap plastic foodwrap around the stem first, next secure it, and then install the sensor. It will be understood that this prescribed procedure tends to prevent sap and condensation intrusion into the sensor-body.

The user should install heater securely, using approved Teflon release application; wrap layers of aluminum foil around exposed trunks and stems especially from gauge to ground level; shade plant pots from sun; cover soil around potted plants with foil to reflect sunlight; shade large exposed trunks below gauge; cover with aluminum foil. Then, the user should preferably install sensor in the mid-afternoon at minimum plant diameter; check heater for fit against stem.

TABLE 4

| Checklist - Electrical vs. Verification | |
|---|---|
| Electrical | Verification |
| Connect power grounds and chassis ground together at one common ground point; removes ground loop noise. | Turn on power and observe "instantaneous" voltage changes on dT, AH, or BH; if no change, then no ground noise. |
| Connect common ground point to earth ground to remove induced more to shunt hazardous lightning charges to ground, away from chassis. | Verify with Ommeter, less than .5Ω resistance from chassis to grounded pipe or wall receptacle safety ground |
| Inside environmental chambers: connect a ground lead to the plant stem. The plant canopy acts as an antenna, picking up induced electromagnetic interference from the high voltage sources and conducting noise to the sensor leads | Looking at short term: one-minute readings, there should be no major periodic oscillations |
| Use crimp connectors on power leads; shielded cable: shield lead connected to the ground | Pull on wires and physical inspection |
| Remove induced offset noise, ground bias noise. | Standard with differential voltage measurement provided by recommended loggers; check 50/60 Hz rejection setting depending upon country |
| Measure Vin at gage, not at source of power. | Use cable containing sense leads separate from power leads provided; 4-wire measurement of voltage. |

TABLE 5

| Checklist - Thermal vs. Verification | |
|---|---|
| Thermal | Verification |
| Wrap exposed trunk, branch, or stem with aluminum foil. | Disconnect heater power, or turn off AVR power; observe dT signal for 24 hours to ensure environmental gradients are minimal (<0.25° C.). |
| Remove gradients associated with extreme temperatures; shade stem and sensor. | Disconnect heater power, or turn off AVR power; observe dT signal for 24 hours to ensure environmental gradients are minimal (<0.25° C.). |

TABLE 6

| Solar Panel and Battery Requirements | | | | | |
|---|---|---|---|---|---|
| Dynagage Model | Qty | Solar Panel Model | Qty | Battery Power | Qty |
| SGB5 | 4 | MSX20 | 1 | 90 Ahr | 1 |
| SGB9 | 4 | MXS20 | 1 | 90 Ahr | 1 |
| SGB10 | 4 | MXS20 | 1 | 90 Ahr | 1 |
| SGB13 | 4 | MXS20 | 1 | 90 Ahr | 1 |
| SGB16 | 4 | MXS20 | 1 | 90 Ahr | 1 |
| SGB19 | 4 | MXS30 | 1 | 90 Ahr | 1 |
| SGB25 | 4 | MXS30 | 1 | 90 Ahr | 1 |
| SGB35 | 4 | MXS53 | 1 | 90 Ahr | 2 |
| SGB50 | 4 | MSX53 | 2 | 90 Ahr | 3 |

It is advantageous to check gauges preferably weekly due to rapid growth of some plants. For rapid-growth situations, the plurality of heaters should preferably be loosened to accommodate expanding girth. Of course, it is also necessary to check for sap accumulation and to clean the sensors.

FLOW4 preferably uses solar panel power supply in addition to backup battery and DC source from an adapter. Its solar panel is connected with an external battery. The solar panel power calculator spreadsheet depicted in FIG. 9 should be used to determine the type and power ratings of solar panel-and-battery combination for each application. More particularly, it will be seen from the spreadsheet shown in FIG. 9 that the application uses a FLOW4 system having a Dynagage SGB16 with a 4.5-volt heater; a Dynagage SGB19 with a 4.5-volt heater; a Dynagage SGB35 with a 6.0-volt heater; and a Dynagage SGB50 with a 6.0-volt heater. Hence, this application requires a MSX 53 solar panel and two 90 Ahr external batteries. The typical solar panel and battery required for a plurality of Dynagages used preferably includes four Dynagages of specified type with 5-volts heater, ESH of 5.0, and with power down and operating time of 15 hrs/day.

Another aspect of the present invention is FLOW4 software. PC systems running on Windows platforms or the like may be used to support software implemented into embodiments of the present invention. It has been found that a PC used in conjunction with the present invention should preferably have at least 1 MB of RAM and 5 MB of hard-disk space. It should be evident that the software aspect of FLOW4 is preferably a Windows-based application. In the preferred embodiment, FLOW4 requires a 9-pin COM1 or COM2 port with serial input; USB connections or the like may alternatively be used. As will be understood by those skilled in the art, FLOW4 includes a user-friendly graphical interface that enables input to be expeditiously specified, and then enables output to be conveniently reviewed and analyzed by a user/grower. Illustrative data files are provided for history, data-logger, and default FLOW4 setup information. This software has been developed with a setup file that provides a step-by-step procedure to assure that fool-proof installation is effectuated.

FLOW4's user interface provides a user-friendly vehicle for monitoring and controlling embodiments of the present invention—including a plurality of sensors, a power supply, communications implemented via a RS-232 cable with 9600-baud rate, 8 data bits, no parity and one stop bit. A 9-pin "D" connector on the circuit board should preferably be connected 1:1 to the 9-pin "D" serial connector found on contemporary PCs and laptops or notebook computers well known in the art. When powered-on or reset, in a manner well known in the art, the circuit board responds with the software name and version number, and a memory test is forthwith performed.

Figure 10:
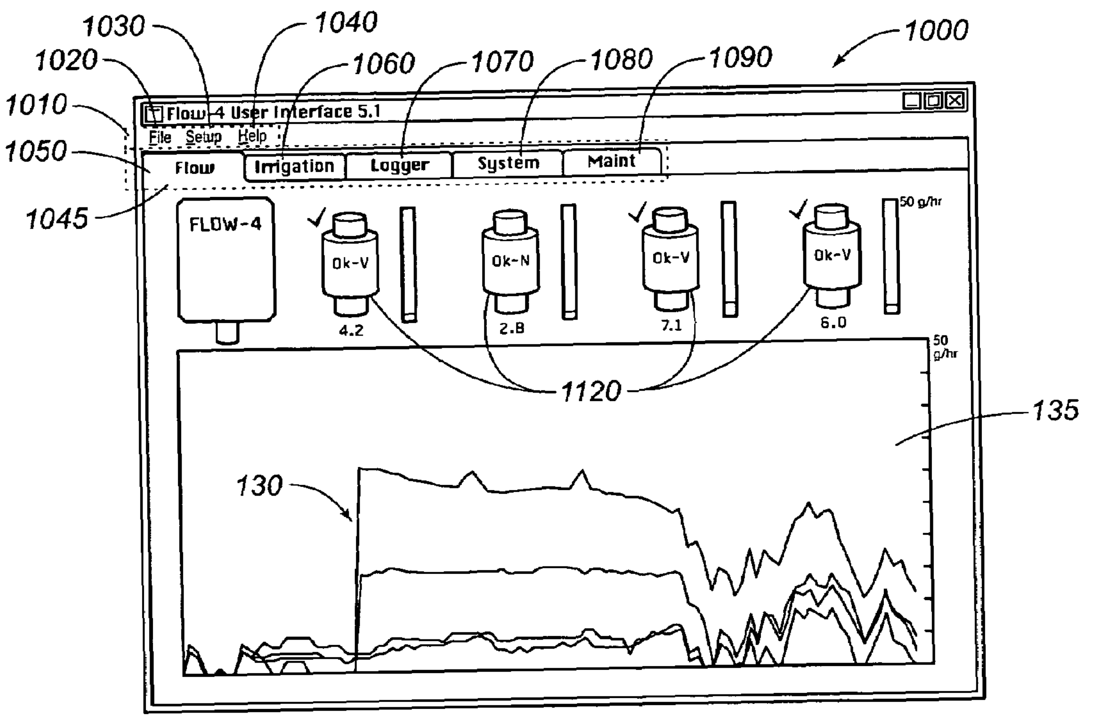
FIG. 10 depicts the main window of the user interface of the preferred embodiment, containing a menu bar atop with three menu controls: File, Setup, and Help.

As shown in FIG. 10, main window 1000 contains menu bar 1010 disposed at the top thereof with three menu controls: File 1020, Setup 1030, and Help 1040. File Menu 1020 contains save and read functions for history and logger data. In a manner well known in the art, each of Save History, Open History, and Save Logger functions can be performed by clicking on the appropriate menu item. Setup Menu 1030 activates running through all the steps in the FLOW4 setup procedure as will hereinafter be explained. Help Menu 1040 provides help on a particular setting. Immediately below this menu bar preferably are five tabs for invoking one of the appropriate control screens, which are displayed by clicking the appropriate control tab in a manner well known in the art.

Under this tab control, available screens are: Flow 1050, Irrigation 1060, Logger 1070, System 1080, and Maint 1090. Flow screen 1050 contains information about auto-zero, power save time, number of Dynagages and Dynagage setup, and flow rate information. Irrigation screen 1060 contains information about irrigation scheduling, type of field, information about field, stem/field indexes. External sensors rain gauge, flow meter, auxiliary sensor, irrigation valve control are monitored from the Irrigation screen. Logger screen 1070 contains information about data logger capacity, status, command buttons for logger mode and data retrieval are available. System screen 1080 contains information about voltage, heater voltage, PC date and time, reset buttons. Maint screen 1090 contains information intended for maintenance purposes and in-factory testing only, wherein the system can be monitored continuously and commands sent from the command window.

Figure 11:
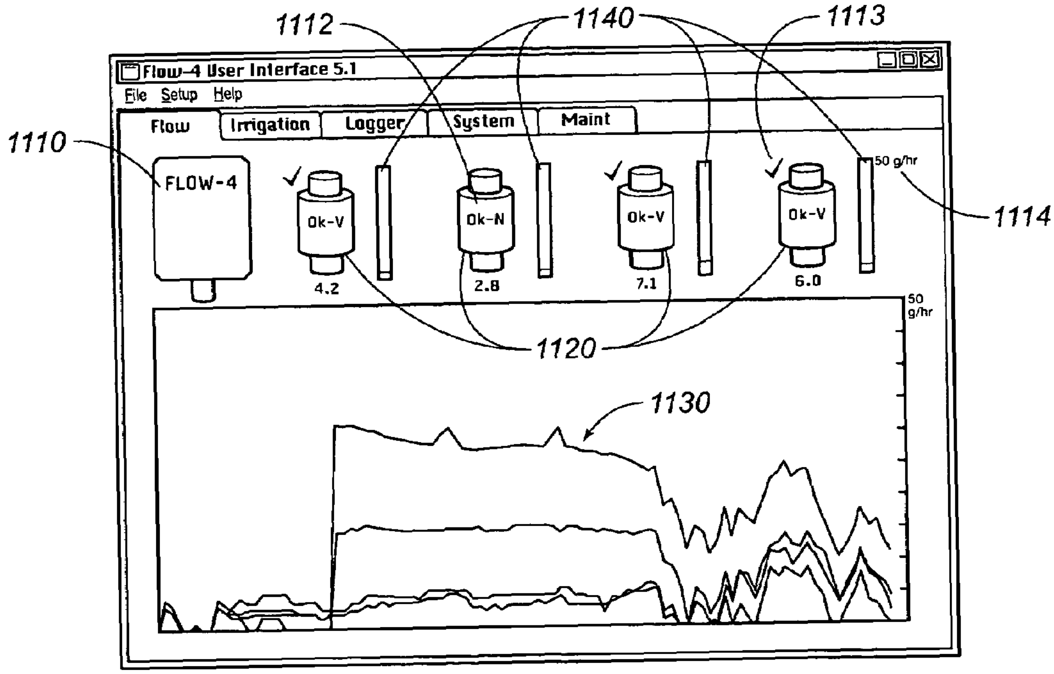
FIG. 11 depicts the vertical rectangle icon with label "FLOW-4" corresponding to the FLOW4 system setup icon.

The Flow Screen is displayed by clicking on Flow tab 1050 in Main window 1000; it appears by default when the user interface is launched and has the information for setting up and monitoring sap flow system of up to four sensors and zero. As shown in FIG. 11, the vertical rectangle icon with label FLOW-4 is FLOW4 system setup icon 1110. Concentric cylindrical shapes 1120 represent a plurality of Dynagages and the black are with dimensions marked corresponds to charting area 1130 for flow rate. Sap flow in grams per hour is plotted in charting area 1130. Each concentric cylindrical gauge icon represents a Dynagage or the like; it shows the gauge status, flow rate and other status information. The number disposed at the center of Dynagage icon 1120 informs the user about the status of the Dynagage—as enumerated in Table 7.

TABLE 7

Gauge Status

| Status Display | Gage Status | Description | Status Code |
|---|---|---|---|
| OK-V | VOTING | Dynagage data valid, not voted out; data used computing avg stem flow | 1 |
| OK-N | NOT VOTING | Dynagage data valid, voted out; data not used computing avg stem flow | 2 |
| Warm | WARM UP | Dynagage in pre-warm up, no auto-zero done; sap flow set to zero | 3 |

TABLE 7-continued

Gauge Status

| Status Display | Gage Status | Description | Status Code |
|---|---|---|---|
| Fault | FAULTED | Dynagage not connected properly or needs maintenance; check for loose cables or connectors | 4 |
| K-Hi | $K_{SH}$ HIGH | Assigned or current value of $K_{SH}$ high | 5 |
| Err | MATH ERROR | Calculation overflow for gauge | 6 |
| Max | MAX FLOW | Maximum flow indicates temp rise too low; <0.25° C. at high flow rates; calculated flow > maximum usable sensor capability | 7 |
| Off | OFF | Gauge cable is off or not connected; bad connection in heater wiring | 8 |

Other indications of gauge status include a check mark, flashing gauges, ghost gauge icon, bar graph, flow rate, and stem gauge dialog. A check mark on the upper left of the gauge icon indicates that data therefrom is valid and accounted for in the average sap flow calculations. A flashing gauge indicates a fault therein—attributable to either $K_{sh}$-high, math-err, faulted, or max-flow. The ghost gauge icon indicates that the Dynagage cable is off or is not connected. Bar graph 1140 adjacent each gauge indicates the sap flow reading; scaling of the bar graph is the same as the plot scaling. The flow rate, displayed at the lower end of gauge icon 1120, represents the stem flow rate in g/hr. The Stem Flow Gauge Dialog is invoked by clicking on gauge icon 1120, thereby opening the Stem Flow Gauge dialog; gauge settings can be viewed or modified. After making any changes in the gauge parameters, pressing "OK" and then pressing "YES" at the Configure Gauge? prompt signals acceptance of the changes.

Charting area 1130 preferably displayed with a white background depicts flow readings in real-time plotting all four gauges in colors that match the bar graphs or average flow history when history plot is selected by the user. The charting area is marked with a horizontal scale representing time and vertical scale representing flow rate in g/hr. Maximum flow rate is same as the maximum for the bar graphs and is shown on the top right corner of the charting area. This charting area is preferably updated every scan-interval. Clicking on the charting area opens the Charting Control dialog and enables the user to set charting options. Arrows on the right of the charting area serve as scroll buttons. The left-pointing arrow is invoked to move the data plot to the left; similarly, the right-pointing arrow enables scrolling of the plot to the right.

Figure 12:
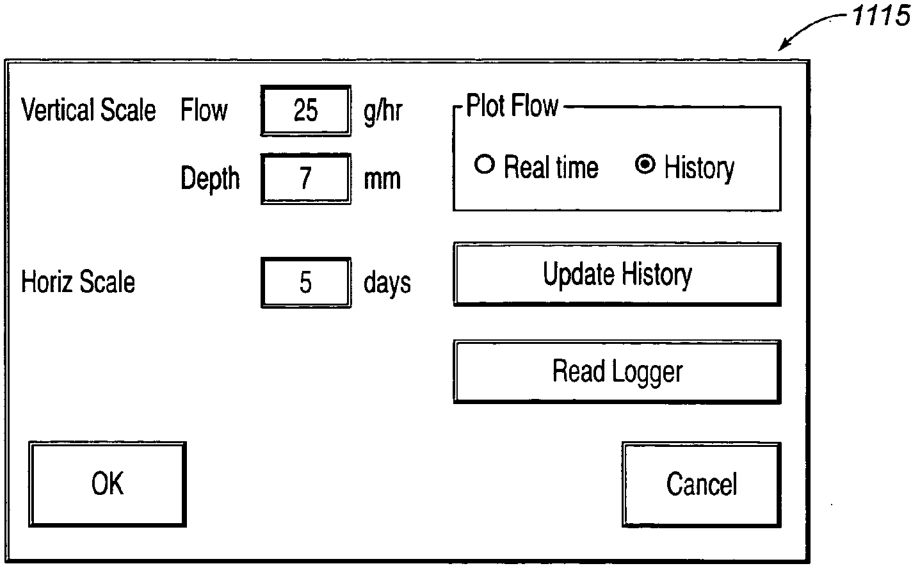
FIG. 12 depicts the Charting Control dialog box of the preferred embodiment.

The Charting Control dialog depicted in FIG. 12 displays information about horizontal scale, vertical scale, and real-time vs. history plot. For ascertaining vertical scale—flow, vertical scaling is shown in grams/hour for the bar graphs and flow plots for real-time and history flow rates. For ascertaining vertical scale—depth., vertical scaling is shown in mm depth for water use in real-time and also for water use, rain, irrigation in the history plot. Also, for ascertaining horizontal scale, number of days to display on the history chart, has no effect on the real-time plot. For ascertaining plot flow, real-time plot or history plot is preferably displayed in the charting area by clicking on the corresponding radio button. For ascertaining update history, the command Update History triggers collection of sap flow and irrigation, daily use history data stored in FLOW4 for display in the user interface. The user may refresh the graph as appropriate by clicking on charting area 1130. Upon this collection of history, the collected information can be viewed on the History plot which is displayed on the Irrigation screen. The user should invoke the Use SAVE HISTORY AS command from the FILE menu to save the data preferably to a text file. By invoking Read Logger, logger data is read, in FLOW4's software, to an array therein; the user then can view the logger data in the maintenance screen by invoking the READ LOGGER command button.

Figure 13:
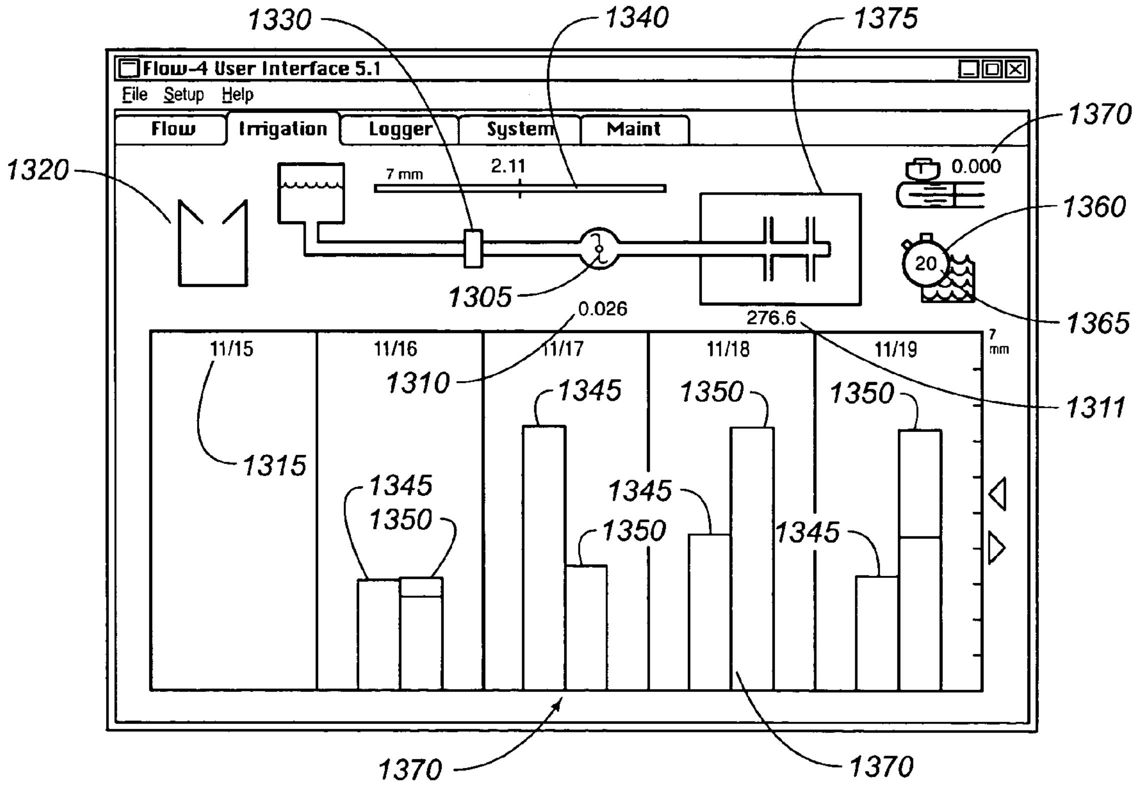
FIG. 13 depicts the Irrigation screen of the preferred embodiment, providing information about a particular irrigation parameter.

The irrigation screen contains information about the particular field, irrigation controls, rainfall and water-balance. By clicking on the Irrigation tab the user can access the Irrigation screen. Each icon in this screen provides information about a particular irrigation parameter as shown in FIG. 13. The water meter measures the amount of water flowing through the pipe; accumulated water flow or irrigation is displayed below the water meter icon 1310 preferably in blue. The rain gauge records the amount of rain in mm measured by preferably tipping bucket therein; rain gauge data is preferably updated every minute or the like. The amount of rainfall in mm since last reset is displayed below rain gauge icon 1320. Blue vertical rectangular icon 1330 located along the irrigation pump is the icon for the irrigation valve; the state of this irrigation valve changes from open to close or vice versa when the user clicks on the valve icon and then selects a suitable option from the corresponding popup dialog box.

Before opening the irrigation valve, it has been found to be preferable for the user to confirm that the amount of water to irrigate has been entered therein. The water-balance icon corresponds to bar graph 1340 disposed on the Irrigation screen: this bar graph displays deficit/surplus or water in the field. Deficiency of water is displayed in orange on the left half of the bar graph 1345 and surplus water is displayed in blue on the right half of the bar graph 1350. The scale for the bar graph is preferably the same as the scale for the charting area in mm. The user should click on the bar graph to open the Water-Balance dialog box; the water-balance is then displayed in mm indicating the surplus/deficit concomitantly with the amount of water in liters needed in the field. The user should press "OK" to close the window.

It has been found to be advantageous to alert the user about the time until the next irrigation will be required. Accordingly, in the preferred embodiment, Time to next irrigation is displayed on the next irrigation icon, with an irrigation clock being displayed on the right end of the Irrigation screen. To view the time to next irrigation, the user should click on the Next Irrigation icon thereby opening a dialog box that displays the time to the next prerequisite irrigation in hours. The user should press "OK" to close this dialog box.

Concomitantly with four sap flow sensors, water meter, rain gauge, irrigation valve, FLOW4 accommodates an external sensor that can measure soil moisture, solar radiation etc. It should be understood that reading from the auxiliary sensor preferably does not affect the core operation of FLOW4; instead, it is an index to supplement FLOW4 data and can be used for obtaining data unrelated to current FLOW4 operation. It has been found advantageous to use such auxiliary external sensor as a soil moisture sensor, ML2x. It will be appreciated that preferably any sensor that has a single output signal can be connected to the external port of the present invention. The scanned voltage value is used to compute the required parameter according to the following linear relation:

$$\text{Sensor reading in Units} = (\text{mV} * \text{Multiplier}) + \text{Offset}$$

where MV is sensor voltage in mV; Multiplier is Multiplier in linear relation; Offset is the Offset therein; Units is the units in which the sensor value is calculated. As is common in the art, the multiplier and offset are assigned according to the particular units.

Figure 14:
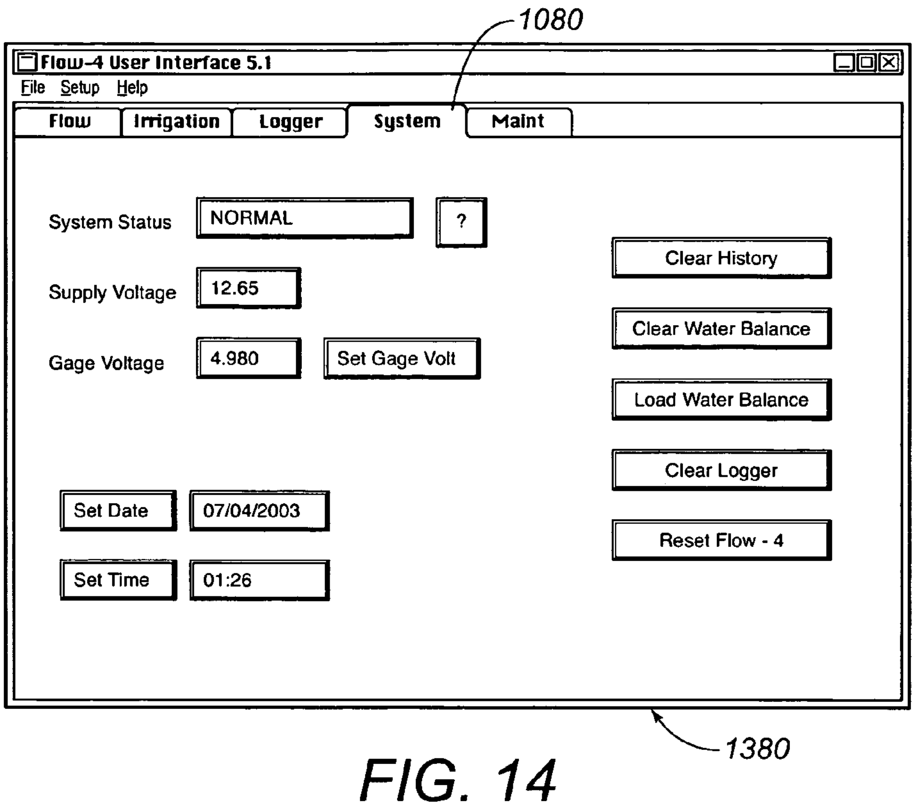
FIG. 14 depicts the system screen of the preferred embodiment.

Now referring to FIG. 14, clicking on the System tab invokes the System screen which provides information pertaining to voltages, system status, time and other control commands. As will be understood by those skilled in the art, the System screen monitors system status; supplies voltage to the system, Dynagage heater voltage; sets Dynagage heater voltage; sets date and time; clears history memory; loads, alters or clears water-balance and accumulators; and reboots FLOW4.

Figure 15:
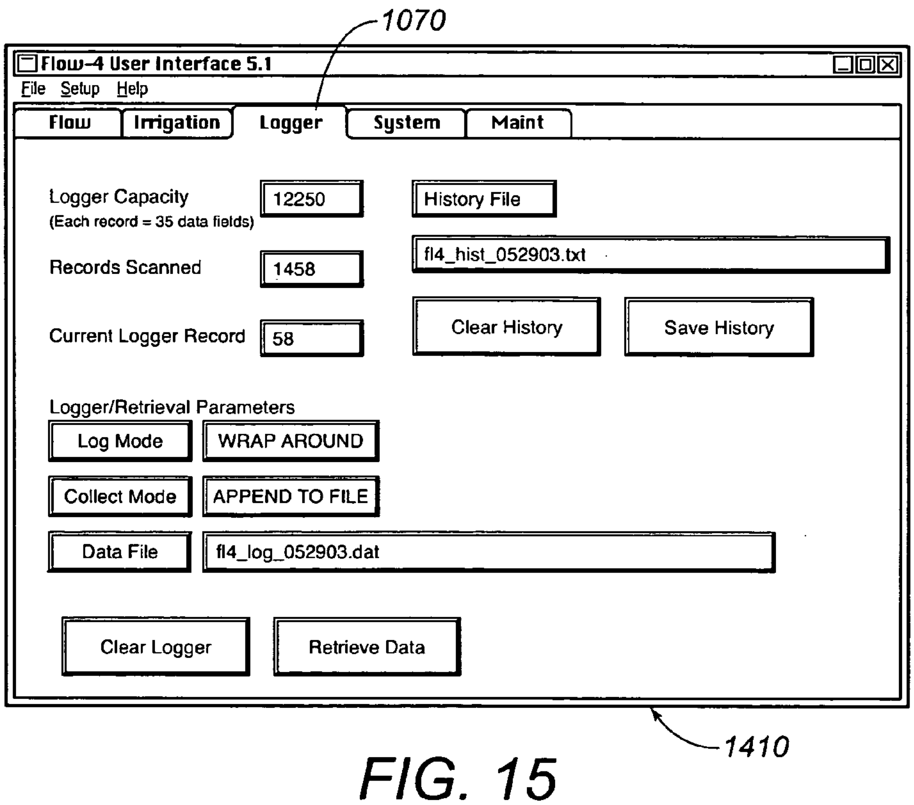
FIG. 15 depicts the Logger screen of the preferred embodiment.

Referring to FIG. 15, according to the preferred embodiment, in order to view logger status and data retrieval, the user should preferably open the Logger screen by clicking Logger control tab 1410. It should be understood that logger capacity is the total data capacity of the logger displayed as the extent of data the logger can hold; total data logger memory is at least 28 KB. Records scanned corresponds to the number of data sets that have been scanned and logged-since last reset operation. Current logger record shows the physical location of the logger wherein current data is stored.

Figure 16:
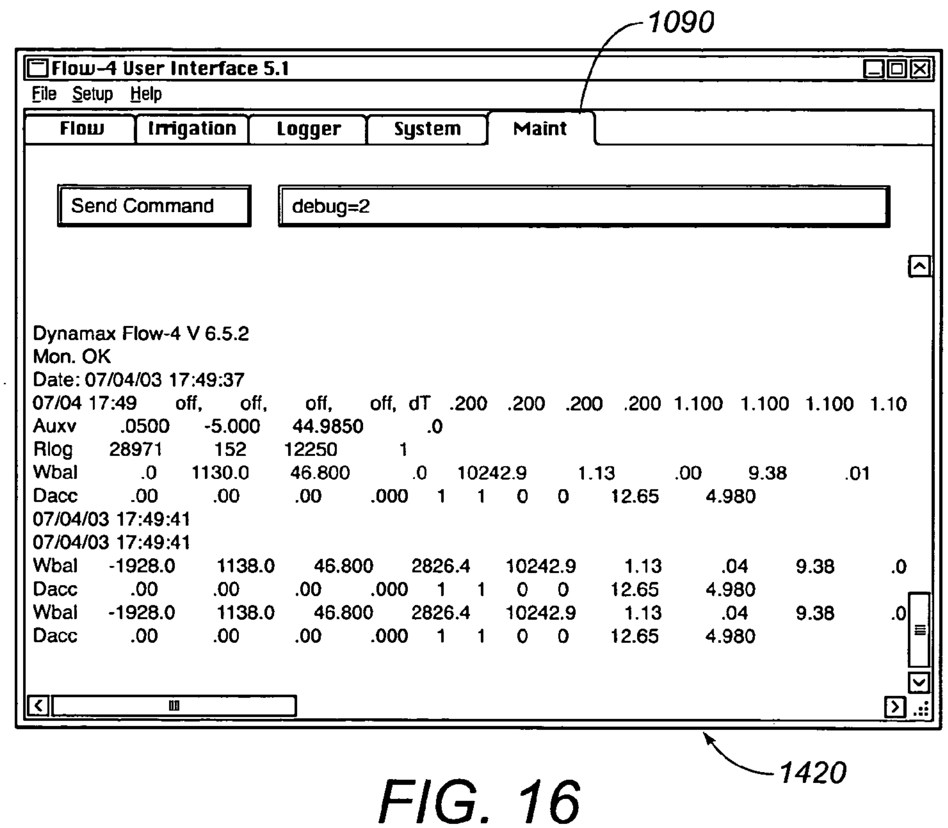
FIG. 16 depicts the Maintenance screen of the preferred embodiment.

As depicted in FIG. 16, the Maintenance screen is intended to be used for trouble-shooting operation of the preferred embodiments and is also contemplated to invoked for factory-testing. To view the Maintenance screen, the user clicks the Maint tab on the tab control; this Maint screen provides access to debug console; command console; and Sendcommand functions, implemented by a plurality of buttons in a manner well known in the art. When FLOW4 is powered ON, the communication function of the present invention—under the preferred embodiment, between the FLOW4 graphical user interface ("GUI") and hardware—is shown in the debug console of the maintenance screen. The debugging commands will be enumerated herein.

To trigger the communication aspect of the preferred embodiment, the user should enter the required query in the command console and then click the Send Command button. FLOW4 will respond appropriately concomitantly with the query displays therein. The prompt character is ">"; if the variable "debug" is set to zero, i.e., "debug=0," then it will be understood that no debugging is required. For this no-debugging condition, the (>) prompt character is printed only once, and commands are not echoed to the screen. If the user invokes a terminal emulator, the first command that should be entered is "debug=1." Under the teachings of the present invention, it is contemplated that the user will not to leave FLOW-4 in debug mode during normal operation thereof per the GUI. For trouble-shooting, "debug mode=2" should preferably be invoked. When FLOW4 is powered on or reset, it responds with software name and version number, and a memory test is performed. Results of these tests can be viewed from the Maint screen.

Figure 17:
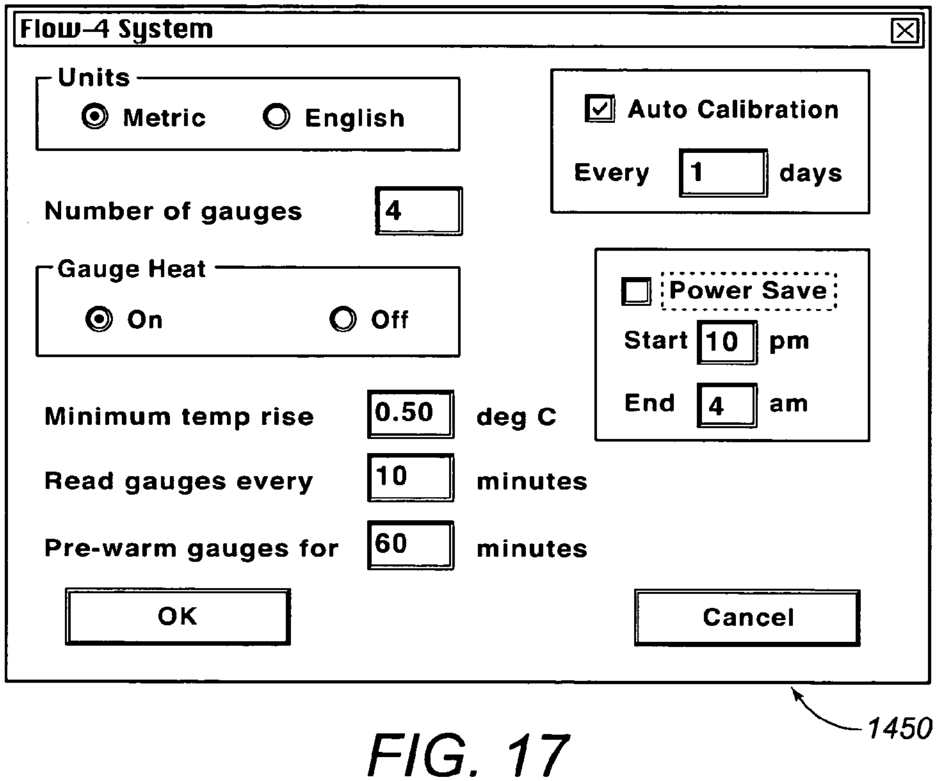
FIG. 17 depicts the FLOW4 System dialog box of the preferred embodiment.

As depicted in FIG. 17, in a manner well known in the art, the user should click the FLOW4 icon to open the System dialog box which necessitates inputting the following panoply of information for setup purposes: units, number of gauges, gauge heat, minimum temp rise at night time, frequency to read gauges, and Power Save option. To select system units, the input variables are assigned and commensurate results are generated. The user should invoke Choose Metric for cm, gm, etc or Choose English for foot, pound, etc. All scientific units such as watts, volts, and ohms, etc., are exceptions to this choice. The text box next to "Number of gages" represents the number of gauges that are connected and scanned. To modify the number of gages, the user should simply enter the new value and press "OK." The Gauge Heat indicates whether heater voltage to the Dynagage is applied or not. When Gage Heat is ON, voltage controlled by potentiometer is applied to the plurality of Dynagages. By selecting Gage Heat OFF, the voltage applied to a Dynagage heater is zero, wherein the gauges are OFF and no valid data is obtained from the plurality of sap flow sensors.

The minimum temp rise at night time displays the minimum temperature increase for flow rate to be valid. When Qf sap heat dissipation is low, this dT value is checked; Qf is less than 50% of Pin only at night, or at very low flow rates. The dT value is checked so that an internally-invoked calculation will not include division by zero, or division by near-zero values. In order to change the minimum temperature rise, the user should enter a new value into the input box next to the label and then press "OK." This value for minimum temperature rise should always be greater than 0.2° C.

Read Gauges Every displays the interval in minutes at which gauges should be scanned. It will be appreciated that the minimum interval is 1 minute and that it is contemplated that the scan interval will be 30 minutes or 60 minutes. This is the warm-up period for the gauges during which heater voltage is applied and no zero/Ksh set is performed. An adequate warm-up time such as 60 minutes is preferably effectuated. In order to perform auto-zero and set new Ksh value, the user should check the control box and enter the interval (in multiples of days) in the text box. When this is selected, the FLOW4 system performs auto-zero between 2 AM and 5 AM, and overwrites the Ksh value for each gauge with the calculated Ksh value.

As is common in the art, Power Save is an optional feature that is recommended to be activated for sap flow monitoring, which can be deactivated off during night times when the flow rates are very low. Text boxes next to Start and Stop, display Power Save mode. During Power Save mode, heater voltage to the Dynagages should preferably be zero. External sensors should preferably be monitored during power-save operation. The system of the present invention will not perform the zero-set during this time; if auto-zero option is chosen, then it will override the power-save option.

Thus, to perform the setup for the preferred embodiment of the present invention, the user should click on the FLOW4 System icon in the Flow screen. In the FLOW-4 System dialog, the system of units is then selected by clicking on the appropriate radio button. English units or Metric units should be selected, with Metric being the default units. The user should then enter in the edit box adjacent the Number of gauges, the number of interconnected Dynagages.

Next, the user should preferably click on the Gage Heat ON radio button to set heater voltage for the Dynagages; and then enter the minimum temperature rise in ° C. in the edit box; the scan interval in minutes—usually 30 minutes—should be entered. The user should plug-in the value for warm-up time for the plurality of gauges in minutes—which is usually 60 minutes. Auto-calibration, if selected, should preferably be performed at 5 AM. The user then checks the auto-calibration box in order to perform auto-calibration and overwrite $K_{sh}$ value. Usually the calibration is to be performed every two days; the user should enter the interval in days for auto-calibration.

It will be readily appreciated by those skilled in the art that power-saving is required during night times when sap flow is very low. During power-save, the plurality of gauges are not scanned and heater voltage is turned off. The user should preferably check power-save to activate power-saving operation and enter the start time and stop time thereof. It is an aspect of the present invention that when a plurality of Dynagages are setup on a corresponding plurality of plants, the user should preferably never operate FLOW4 without activating power-saving. A typical power saving time frame is 10 PM to 4 PM. Ergo, when power-saving is activated, the user should click OK and confirm the changes by responding YES at the ensuing prompt. If any changes are required, the user should respond NO at the prompt, which will return the user to the FLOW4 System dialog box wherein changes can be made.

Clicking on the gauge icon opens the Stem Flow Gage dialog shown in FIG. 18. In this dialog, gauge settings can be viewed or modified. After making any changes in the gauge parameters, the user should press OK and then press YES at the "configure gage?" prompt to accept the changes. Table 11 enumerates the Dynagage setup variables.

TABLE 11

Dynagage Setup Variables

| Label | Variable | Description |
|---|---|---|
| # | Gage number | 1–4; as appears on gage cable |
| Rate | Flow rate g/hr | Calculated flow rate for gage g/hr |
| dT | Rise in temp ° C. | Rise in temp between two points |
| Type | Type of gage | Per Dynagage label |
| System area | System area $cm^2$ | Where gage is connected |
| TC gap | Thermocouple gap | |
| $K_{st}$ | Stem constant W/m * K | Constant for the plant |
| $K_{sh}$ | Sheath constant W/mV | |
| Calculated $K_{sh}$ | W/mV | Calculated sheath constant value |
| Heater Resistance | Ω | Heater strip per Dynagage serial label |

The user should set voltage to the plurality of Dynagage sensors: heater voltage in volts applied to the Dynagage heater coils which can be measured from test point #TP4. To change the heater voltage, the user should press the command button Set Gage Volt that pops up the gauge voltage dialog box. Now, heater voltage to the Dynagages can be adjusted by turning the potentiometer knob "Heater Voltage" on the FLOW4 control panel. The continuous change in voltage is displayed on the gauge voltage dialog box. EXIT should be clicked to close the gage voltage dialog box. The new value of heater voltage is displayed next to gage voltage.

In the preferred embodiment, as shown in FIG. 19, the green rectangular icon in the Irrigation screen corresponds to the Automatic Irrigation icon. Clicking on this icon opens an Automatic Irrigation dialog which includes information about the type of irrigation, irrigation schedule, properties of the field, indexes that are useful in calculating flow and water-balance for the entire field. For Type of Irrigation, there are three radio buttons at the top of the Automatic Irrigation dialog box: Field, Green House, No Irrigation.

Selecting "Field" indicates that the irrigation is being performed in a large field where plant density is calculated instead of number of plants. As will be understood by those skilled in the art, choosing "Green House" is appropriate when irrigation control/sap flow monitoring is being performed in a small portion of land or for a select-few plants. In this scenario, the effect of rain is not taken into account and area of field is fixed to 1 hectare. The user should choose "No Irrigation" when there is no automatic irrigation and FLOW4 is used just as a sap flow monitoring system; rain gauge, water meter taken into account, and water balance are calculated. Selecting Irrigate Every effects the display of irrigation interval in days or hours in the case of automatic irrigation. The Start At selection displays the time in hours at which the irrigation is scheduled to start in case of automatic irrigation. According to the present invention, Valve is opened one minute after the scheduled hour and closed when the water meter has counted the required amount of water. Selecting Plant Density specifies the plant density in number of plants per hectare in case of field or no irrigation, displaying number of plants in the case of Greenhouse mode.

Selecting Area displays area of the field in hectares. For Greenhouse irrigation, area always corresponds to 1 hectare. Efficiency displays the irrigation efficiency in percentage. The user should specify 100% unless the proportion of water lost during delivery to the crop is known. As will be appreciated by those skilled in the art, if 80 gallons are delivered to the crop for every 100 gallons that pass through the water meter, the efficiency thereof is 80%.

Evaporation displays evaporation per transpiration in percentage. The value 20% should preferably be used unless the amount of water lost due to evaporation in proportion to transpiration is known. If 30 gms of water evaporates off the ground for every 100 gms of sap flow in the crop plant, then evaporation is 30%. Relevant to the Stem/Leaf Index and Field Index: Parameter selection, stem or leaf area indexes are used to scale the average sap flow from the individual gauges to the entire field. As is knoen in the art, the stem area index method uses the stem area of each plant and average stem area of all plants in the crop. On the other hand, the leaf area index method uses LAI of individual plant and average LAI of all the plants in the crop.

For the Stem Area Index Method, the user preferably should enter the stem area for the sample plants and then enter into the stem area in the Stem Gauge setup dialog box for all the gauges in operation. Then, the user should transfer this using the menu sequence Automatic Irrigation>Index Values>Transfer (button). This latter Transfer button will obtain the stem area from what has been specified in the Stem gauge dialog and average them to obtain the average size plant. The average size plant is taken as Field Index. However, the sample plants may be smaller or larger. For Example, Stem Index #1: 2.0; Stem Index #2: 2.0; Stem Index #3: 2.0; Stem Index #4: 2.0; with Field Index: 2.0.

Alternatively, to determine the average stem area, the user should preferably randomly pick from 20 to 50 plants and measure their respective stem areas; and then average these stem areas. The user should next enter this average stem area value in to the field index. For Example, Stem Index #1: 2.0; Stem Index #2: 2.0; Stem Index #3: 2.0; Stem Index #4: 2.0; Field Index: 3.5.

Figure 20:
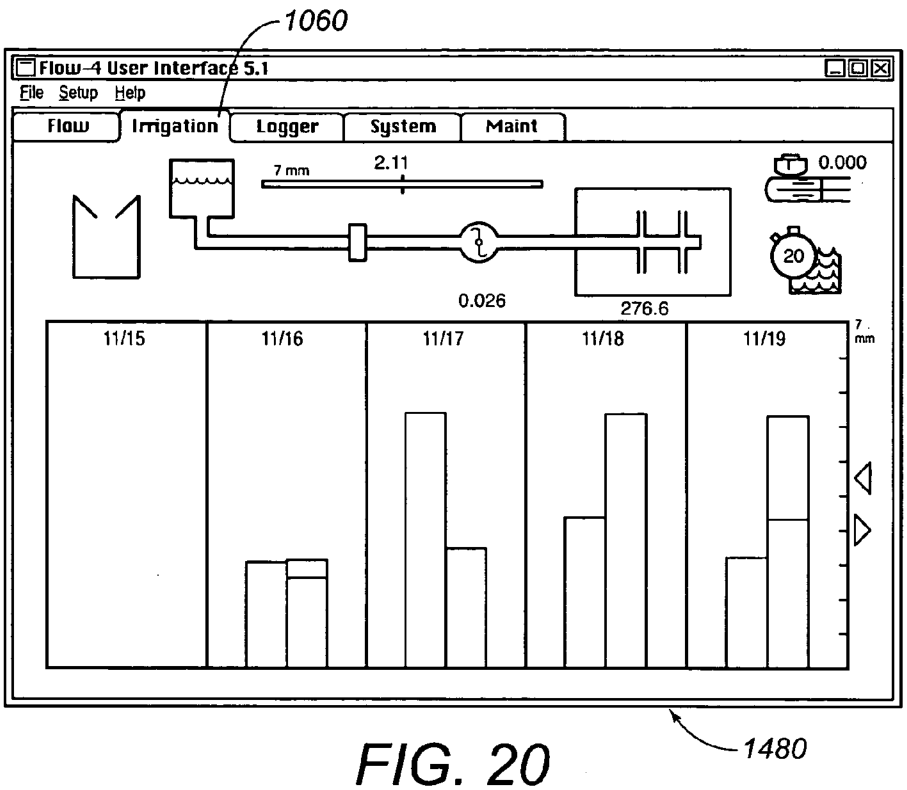
FIG. 20 depicts an Irrigation screen of the preferred embodiment.
Figure 21:
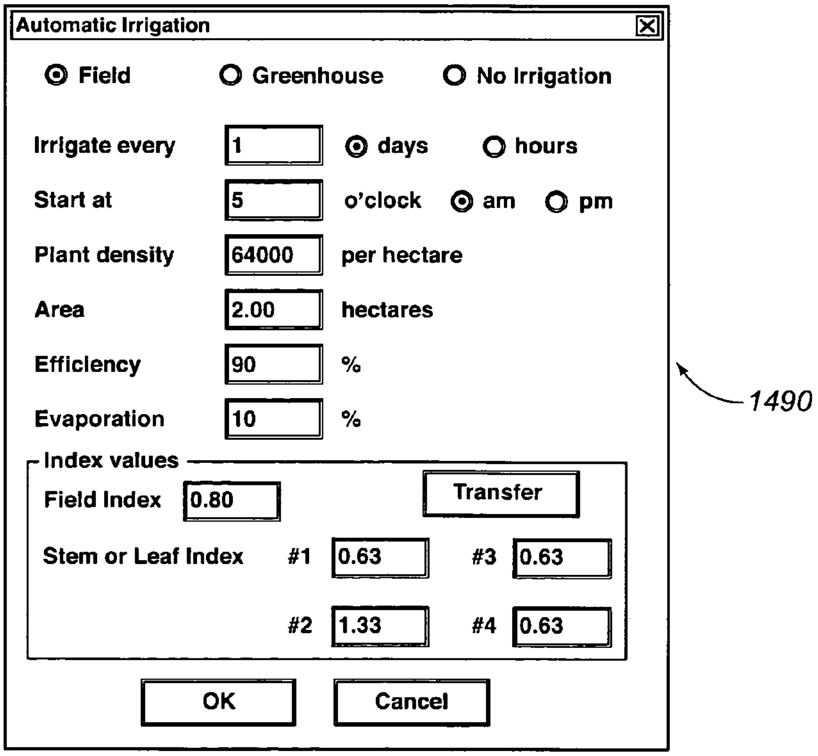
FIG. 21 depicts an Automatic Irrigation dialog box of the preferred embodiment.

For the Leaf Area Index Method, the present invention affords this alternate and accurate method of scaling by using the Leaf Area Index method. The user preferably determines the LAI of each sample plant and the average LAI of the crop by randomly choosing 20 to 50 plants. The user should click on Irrigation tab control to open the Irrigation screen shown in FIG. 20; next, the user should click on Automatic Irrigation icon to open the Automatic Irrigation dialog box shown in FIG. 21. Ensuing selections include the type of irrigation, and Field or Green House or No Irrigation. The dialog box changes according to the type of irrigation. For Field Irrigation, if the selected type of irrigation is field, the user should enter irrigation interval in the dialog box, and then select days or hours by clicking on the appropriate radio button. Then, the user should enter the irrigation start time and click on the radio button corresponding to AM or PM. The user should enter plant density per hectare and edit area of the field in hectares in the edit box next to area; efficiency; evaporation; and percentages.

For the Green House Irrigation selection, if selected type of irrigation is green house, the user should enter irrigation interval in the dialog box, and select days or hours by clicking on the appropriate radio button. Next, the irrigation start time and the number of plants in the greenhouse that is under test should be entered. The Area of the field is set to 1 hectare in greenhouse mode. Irrigation system design efficiency (usually 80%) is entered evaporation percentages (usually 10%).

For the no-irrigation situation, the user should follow same procedure that is followed for field-irrigation. Thus, for Irrigation Interval, the irrigation interval should be entered in hours or days, and then the appropriate radio button should be clicked. Under the preferred embodiment, the recommended value is 1 day. For the Start at entry, the Irrigation start at field is valid only if the irrigation interval has been specified in days and the corresponding Days radio button has been clicked. Where irrigation interval has been specified in hours, FLOW4 checks water-balance at the top of the hour and then performs an appropriate action.

For irrigation interval specified in days, the user should enter the hours when to start irrigation. FLOW4 checks water-balance every day at the hour specified in the text box and performs the appropriate action. It has been found that the optimal time to start irrigation is 5 AM; accordingly, this commencement time is recommended herein. Where information should be entered pertaining to plant density, it should be understood that plant density corresponds to the number of plants per hectare, expressed as units of plants per hectare. As will be appreciated by practitioners in the art, in order to determine plant density, the user should preferably select a typical sample area of the field, count the number of plants in that area, and then divide the number of plants by the field area. Number of plants should be entered in the text box. Maximum plant density is 655,000 plants per hectare, entered into FLOW4 as "65500"; by contrast, the minimum plant density accepted by the FLOW4 is 10 plants.

Thus, for the Area entry, the user should specify in the text box the area of the field in Hectares. For the entry into No. of Plants, under the greenhouse method of irrigation, number of plants should be used in place of plant density; the user should count the total number of plants in the observatory greenhouse and then enter tens of this number as before in the Edit Text box. In greenhouse, irrigation area of the field is taken by default to be 1.0, wherein number of plants is the same as the plant density. Under Efficiency, the irrigation efficiency corresponds to the efficiency of the irrigation system design efficiency. As will be appreciated by those skilled in the art, efficiency is also a measure of the amount of water/irrigation loss over the land. It will be understood that the best irrigation efficiency known in the art is 80%-90%. Ergo, irrigation efficiency of 80% implies that when 1 liter of water constitutes a deficit in the field, the actual amount of water to be pumped is 1/0.8=1.25, i.e., a 25% additional quantity of water is required to be pumped in order to nullify the deficit in the field.

It should be readily appreciated that evaporation accounts for the water lost due to evaporation as a proportion of transpiration. The extent of evaporation depends upon age of crop; spacing between plants; maturity of the crop; type of irrigation. That is, if 30 liters of water evaporates from the ground for every 100 liters of sap flow in the crop, the user should enter 30%. A typical value for evaporation is 20%. For example, in a widely-spaced crop, evaporation can be up to 50%; on the other hand, in a covered crop, evaporation typically is only 10%. In spray type irrigation, evaporation can be 20% and 5% for a typical drip irrigation. To obtain stem index from the stem gauge area and then calculate the average to ascertain field index, the user should click the Transfer command button. Alternatively, if the user prefers to invoke a different set of values, then new values should be entered in the corresponding box and then sequential responses of OK and YES should be specified to confirm the changes at the appropriate prompts.

Figure 22:
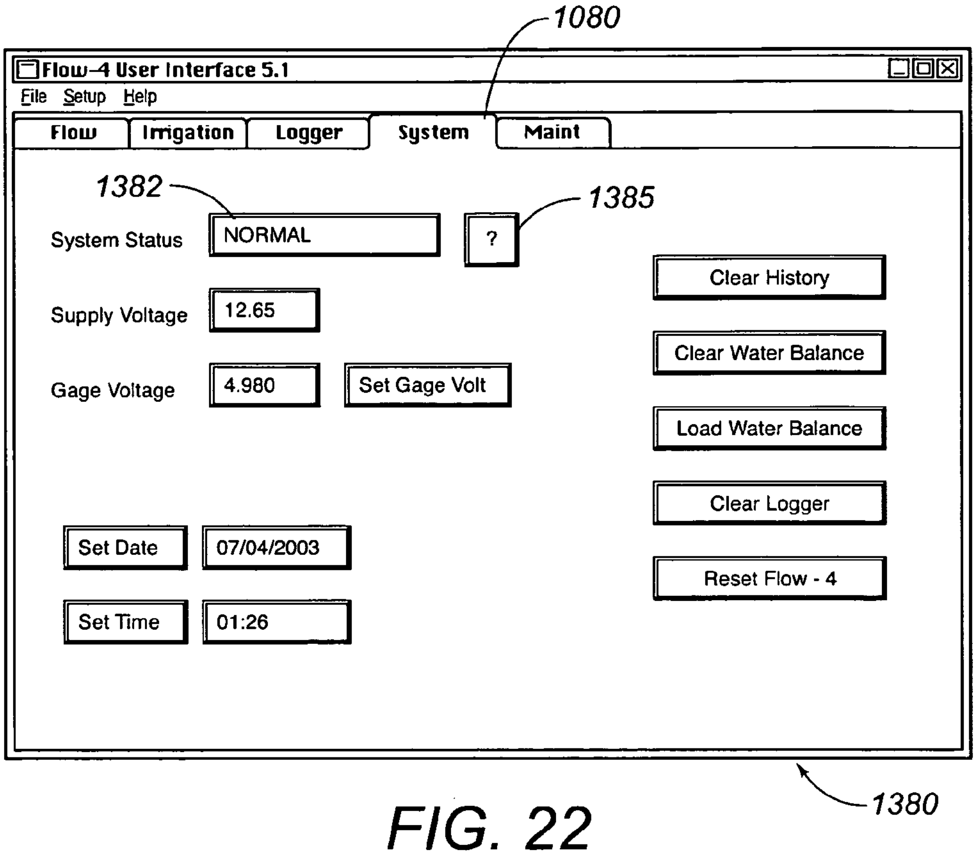
FIG. 22 depicts a System screen to change the heater voltage of the preferred embodiment.

Voltage appearing at test point #TP2 is the supply voltage which is greater of the battery voltage, DC input voltage, and input voltage from solar panel—battery combination. Heater voltage in volts applied to Dynagage heater coils can be measured from test point #TP4. Referring to the System screen depicted in FIG. 22, to change the heater voltage, the user should press the command button Set Gage Volt that pops up the gauge voltage dialog box. Now, heater voltage to the Dynagage can be adjusted by turning the potentiometer knob "Heater Voltage" on the FLOW4 control panel. The continuous change in voltage is displayed on the Gauge Voltage dialog box; the user should click EXIT to close this dialog box. The new value of heater voltage is displayed adjacent the gauge voltage. Table 8 enumerates the heater input voltage for maximum, minimum and typical voltage values.

TABLE 8

Recommended Heater Input Voltage

| Part No. | Min (v) | Typ (v) | Max (v) |
|---|---|---|---|
| SGA2 | 2.1 | 2.3 | 2.5 |
| SGA3 | 2.2 | 2.5 | 2.7 |
| SGA5 | 3.5 | 4.0 | 4.5 |
| SGA9 | 3.5 | 4.0 | 5.0 |
| SGA10 | 3.5 | 4.0 | 5.0 |
| SGA13 | 3.5 | 4.0 | 5.0 |
| SGA16 | 3.5 | 4.5 | 5.0 |
| SGA19 | 3.5 | 4.5 | 5.0 |
| SGA25 | 3.5 | 4.0 | 5.0 |
| SGA35 | 4.5 | 5.5 | 7.0 |
| SGA50 | 4.5 | 5.5 | 7.0 |
| SGA70 | 5.0 | 6.0 | 7.0 |
| SGA100 | 6.0 | 8.5 | 10.0 |

Figure 23:
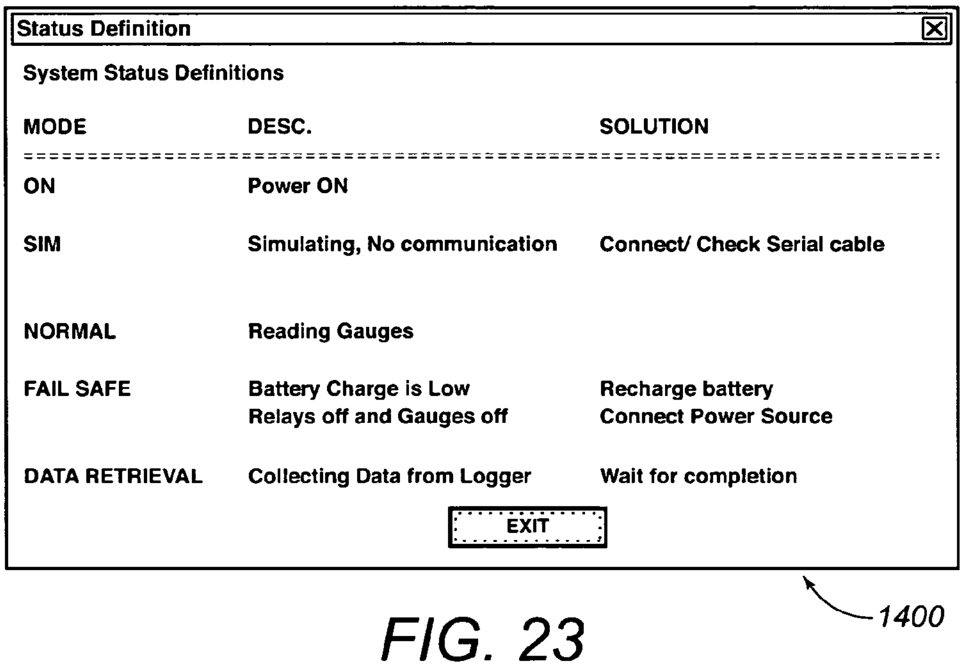
FIG. 23 depicts a Status Definition Help screen of the preferred embodiment.

According to the preferred embodiment, System status displays the current status/operation mode of FLOW4: ON when the power is on to the system but no operation; SIM when FLOW4 GUI is in simulation mode; NORMAL when FLOW4 is ON—scanning gauges and computing flow rates; FAIL SAFE when FLOW4 is operating under a voltage less than the minimum (10V); DATA RETRIEVAL when data is being collected from FLOW4 to software. To obtain help on system status, the user should click on the "?" adjacent the status which, in turn, opens Status definition help screen shown in FIG. 23. This status definition screen provides information about status descriptions and how to make corrections to return the system to NORMAL mode.

Other Control Commands include Date & Time, Clear History, Clear Logger, Clear Water-Balance, and Load Water-Balance. Test boxes adjacent Date and Time display the current date and time from the PC on which it is running. To set date and time of FLOW4 to PCs data and time, the user should click Set Date and Set Time commands. As will be evident to those skilled in the art, these commands collect date and time information from the PC and transfer it to FLOW4 hardware. The Clear History command deletes all flow history data stored in FLOW4 processors' permanent memory; of course, this delete operation does not affect historical data stored in the plurality of disk files. In order to delete flow history data, the user should click on Clear history to trigger a pop-up message box that requests confirmation of this deletion operation. To continue and, indeed, delete all the data, the user responds YES.

The Clear Logger command deletes all data stored in nonvolatile memory (RAM) and resets data logger status. To delete logger data, the user should click on Clear Logger whereupon a pop-up message box appears to confirm this operation. To continue and, indeed, delete all the data, the user should respond YES; otherwise, the response should be NO. The Clear Water-Balance command clears selected components and recalculates the water-balance permanent memory of irrigation accumulators; this includes rain, transpiration, or irrigation. The user should click on the Clear Water Balance command button to open the component selection the dialog box; the check box adjacent the component is then selected in order to clear the accumulator; and then, the user should click on the CLEAR command button.

For example, the settings that place checks in the Water Meter and Sap Flow check boxes, will only clear the water meter accumulator and accumulated sap flow. Similarly, to clear water-balance, all three check boxes must be selected. It will be understood that, under the preferred embodiment, water balance should be cleared when setting up a new system, but it should be noted that the user does not need to clear water balance in order to recover from an error condition.

The user should click on the Load Water Balance command button to bring up the Load Water-Balance dialog box which can accept the new values for water-balance components and subsequently recalculate water-balance. Of course, the user should enter the new value values for rain accumulator, water meter accumulator, accumulated sap flow in respective units and then click LOAD to overwrite the accumulators and next recalculate water-balance.

For the external sensors of the present invention, the new connector cable is a 10 wire cable 3' long that is configured with pigtail connections for Rain, Water Flow, Auxiliary sensor, Irrigation valve. The flow meter measures the amount of water flow in the pipe to the field. The recommended flow meters are FLM2 for a 2" pipe, FLM6 for 6" pipe. It will be understood that every time the flow meter blade rotates one complete rotation, the blade generates a pulse which FLOW4 detects. With a predetermined value of number of pulses per liter, the amount of water flow in the pipe can be calculated as follows:

Amount of water flow (in liters)=(pulses/liter)*number of pulses wherein K-factor/Pulses/liter is set up from the FLOW4 interface. It will thus be appreciated that the flow meter is connected to the input port J10 of the FLOW4 system. The software of the preferred embodiment is setup by clicking on the Flow Meter icon in the irrigation screen to open the Water Meter dialog box. Using the tabulation of K-Factor depicted in FIG. 24, the appropriate K-factor is found (Clicks per liter) for the pipe being used. Then, the user enters the clicks/liter and clicks OK; and confirms the changes by responding YES at the prompt. Next, the amount of water flow is shown in liters in the dialog box The Rain Gage option measures the amount of rainfall by the tipping bucket: every time the bucket is filled on one side it flips to the other side, thereby generating a pulse that is detected by FLOW4. The user clicks on the Rain Gage icon to view the amount of rainfall in mm, wherein ten pulses generated by the rain gage is equal to 2.54 mm of rainfall. The user clicks on the Rain Gage icon to view the Rain Gage dialog box. The amount of rainfall is displayed in mm of rain.

Figure 25:
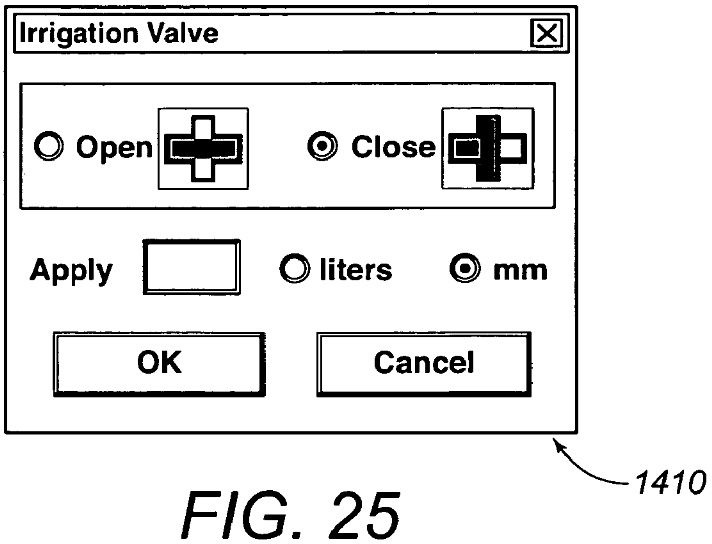
FIG. 25 depicts the Irrigation Valve Control dialog box of the preferred embodiment.

As is well known in the art, the irrigation valve controls irrigation to the field; according to the present invention, this valve is preferably controlled by the GUI through a 12V relay. In automatic irrigation scheduler operation of FLOW4, the irrigation valve opens and closes when enough water is pumped automatically without user intervention. Alternatively, the same function can be performed by manual operation. To trigger software setup, the user clicks on the Irrigation Valve icon to open the Irrigation Valve Control dialog box shown in FIG. 25. In order to pump a given amount of water to the field, the user enters the prerequisite number of liters or mm of water in the Edit Text box, and then clicks on the OPEN radio button, which triggers the relay and opens the irrigation valve. As will be readily understood by those skilled in the art, once the required amount of water is pumped, the valve closes automatically.

A generally used external sensor is soil moisture sensor, ML2-x. Other recommended sensors include a solar radiation sensor. Indeed, any sensor that has a single output signal can be connected to the external port of the present invention. The scanned voltage value is used to compute the required parameter using the following linear relation:

Sensor reading in units=(mV*Multiplier)+Offset where mV corresponds to sensor voltage in mV Multiplier corresponds to a Multiplier in linear relation Offset corresponds to offset in the linear relation Units corresponds to units in which sensor value is calculated.

It will be readily appreciated that multiplier and offset are assigned according to the particular units.

Figure 26:
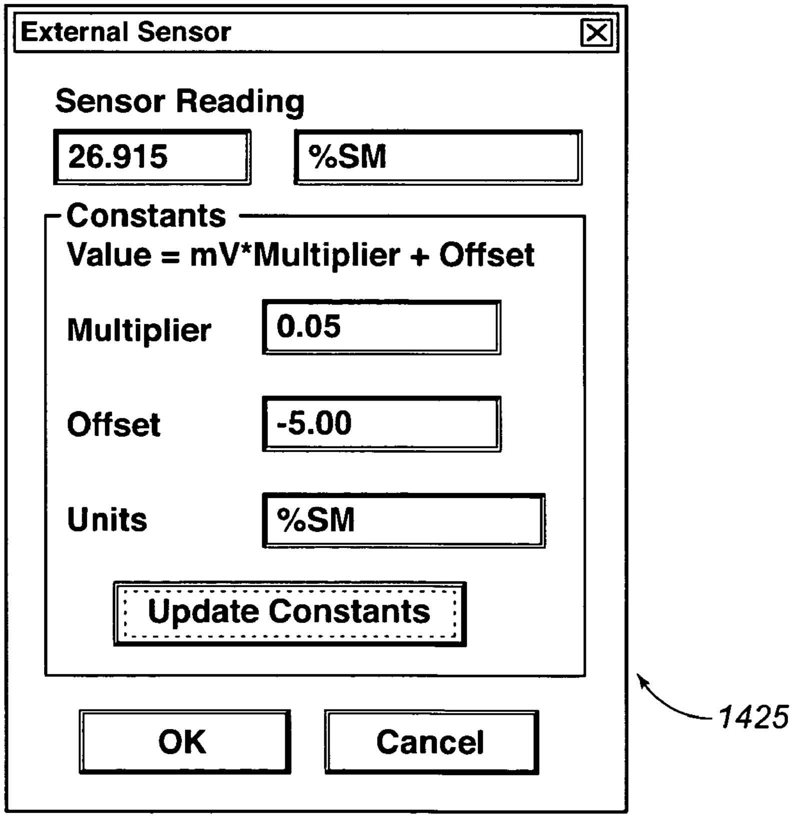
FIG. 26 depicts an External Sensor dialog box of the preferred embodiment.

For the software setup, the user clicks on the auxiliary sensor icon to open Setup dialog box for the auxiliary sensor. Then, the multiplier is entered, and the offset and units in which the auxiliary sensor parameter should be calculated. For instance, the auxiliary sensor constants for mineral soil—multiplier=0.05 and offset=−5.0—and for organic soil—multiplier=0.055 and offset=−2.0—when soil moisture sensor ML2 is used to measure percentage moisture in the soil. As will be comprehended by those skilled in the art, the appropriate set of auxiliary constants are invoked depending upon the soil type. The user then clicks Update Constants to set the new parameters. The calculated value of percentage soil moisture sensor is shown at the top of the External Sensor dialog box depicted in FIG. 26.

For irrigation control, of course, water-balance calculations are important. It will be appreciated that water balance is the deficit or surplus of water in the field and is calculated from sap flow, rain and irrigation as follows:

Water Used (Vol in *Kl*)=Accumulated Sap Flow (grams/plant)*Plant density (plants/hectare) *Field area (in hectares)*1/(1-% Evap Ratio)

Water need (vol in *Kl*)=(Water used (Vol in *Kl*)−Rain (Vol in *Kl*)−Irrigation (Vol in *Kl*))*1/% Irreff Water Balance (mm)=Water need (Vol in *Kl*)/Field area (hectares)

wherein sap flow represents sap flow in grams/plant of the average accumulated amount of water used by the average plant in the field weighted by the plant size; it is the accumulated value since the start of the test. Water used represents the total amount of water in Kl used by all the plants in the field; it is a calculated from accumulated sap flow, plant density, field area—and accounting for evaporation. Water need represents amount of water in Kl required to be irrigated in the field to balance out the water requirement taking into account the efficiency of irrigation. Water Balance represents the water deficit or surplus in mm in the field.

Calculated water balance is used in automatic irrigation control. Positive water balance means that there is surplus of water in the field and no need for any irrigation until the deficit becomes zero. This state is indicated on the interface screen of the preferred embodiment by a blue horizontal bar in the water balance bar graph. If, in the other hand, a negative water balance means that there is deficit of water in the field and requires irrigation of water need (Kl); the same deficit is a negative water balance shown in mm. This state is indicated on the GUI screen with a green horizontal bar in the water balance bar graph For Automatic Irrigation, at irrigation time, water balance is checked for surplus or deficit. In particular, for deficit situation, FLOW4 triggers the irrigation relay and turns on the irrigation LED (green), indicating that irrigation and the pump is turned on. Accordingly, the irrigation valve connected to the relay is turned ON and amount of water flow is recorded from the flow meter. It will be understood that once the required amount of water is pumped, the irrigation relay is triggered OFF thereby closing the irrigation valve.

Now, for manual irrigation, the user can specify the amount of water to be pumped in Kl or mm and set the pump to the OPEN position. For an electrically-operated valve, the user clicks on the Irrigation Valve icon to open the Irrigation Valve control dialog box. To irrigate with a known amount of water, the user enters the number of liters or mm of water in the EDIT Text box, and clicks on the OPEN radio button, which, in turn, triggers the relay and opens the irrigation valve. Once the required amount of water is pumped, the valve closes automatically and turns off the irrigation LED.

This command triggers irrigation relay ON which opens the Irrigation valve, and the flow meter records the amount of water flow in the valve. Once the required amount of water specified in the Edit dialog box is pumped through the valve, FLOW4 triggers the relay OFF, thereby closing the irrigation valve. It will be understood that an electrically-operated valve used in automatic irrigation affords the ideal scenario of automatic irrigation and scheduling. Depending upon the amount of deficit and irrigation scheduling interval and hours, FLOW4 turns the electrically operated valve ON and OFF, at the same time signalling the user with LED or Alarm.

Another common method of irrigation features a manually-operated valve that controls irrigation. FLOW4 can also be used with this method of irrigation, wherein manual irrigation functions similarly to automatic irrigation, except that the irrigation valve needs to be turned Open or Closed in addition to any or all of the steps performed in the normal automatic protocol or the like. For example, under manual mode, to pump a known amount of water, the user enters the quantity of water in mm or liters, clicks the Valve Open radio button, and manually turns the valve open, thereby illuminating the green irrigation LED. The flow meter measures the quantity of water being pumped continuously. Once the required amount of water is pumped, the green irrigation light turns OFF, thereby signaling irrigation system operational personnel to turn the valve OFF. The preferred embodiment optionally invokes a loud alarm in place of or in conjunction with the LED to show irrigation states. For automatic irrigation with manually operated valve, the LED or Alarm plays a significant role in notifying the user about the particular action to be taken.

Figure 27:
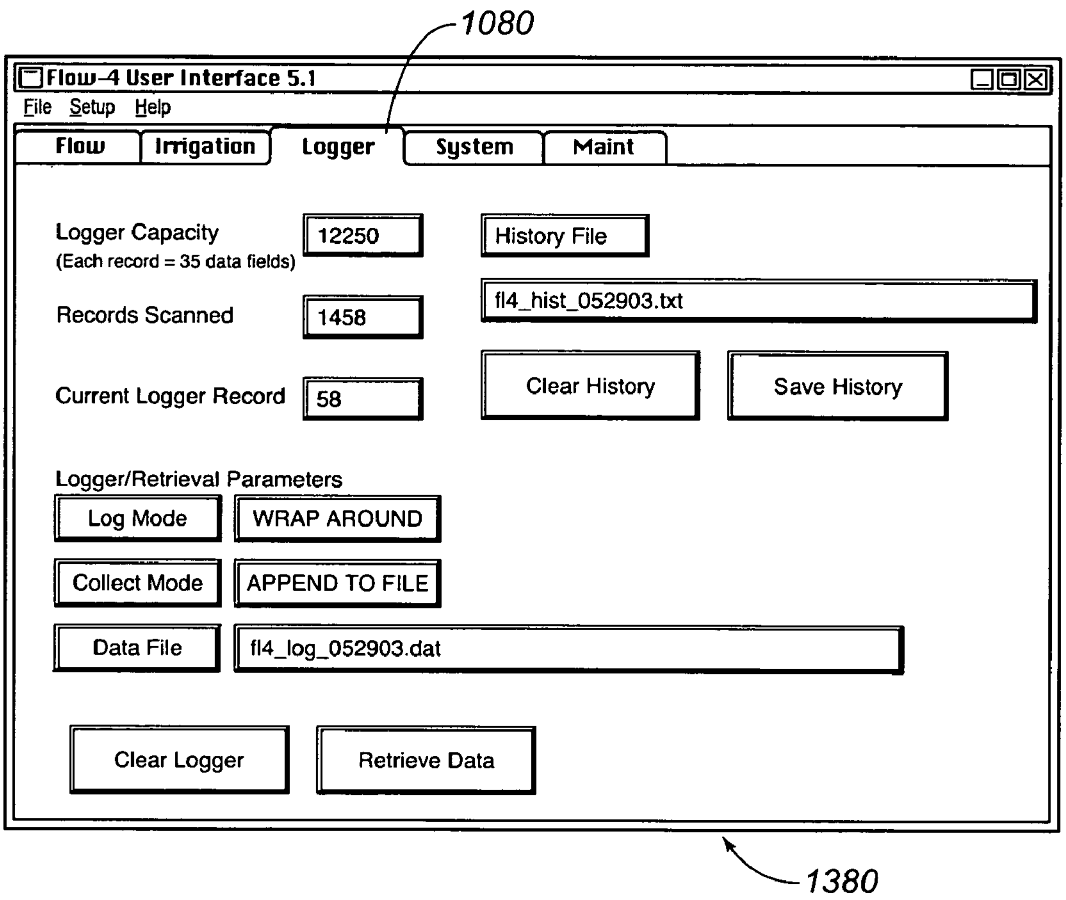
FIG. 27 depicts the Logger Screen of the preferred embodiment.

FIG. 27 depicts the Logger screen that is activated via the Logger tab that schematically shows the data storage modules, data flow and the user commands/actions for data flow between storage modules, which has been found to be helpful dealing with data collection from logger and history data collection. Data logger can be accessed from the logger screen by clicking on the logger tab. This screen enables FLOW4 to be set-up for data logging, data retrieval and analysis. "Logger capacity" displays the number of data elements that can be stored in the logger and is displayed in the text box. "Records scanned" is the number of data records stored in the logger since reset. "Current logger record" tells memory location of the last record being logged. Logger can store a maximum of 350 periods of data; this amount of memory is sufficient for 1 month with a scan interval of 1 hour with power-saving at night.

Logger Retrieval Parameters determine the data collection mode and retrieval modes for data logger. Log Mode is the mode in which data is logged. To change logger mode, the user should click on the Log Mode button, wherein Data Logger mode dialog box appears. The user then chooses Wrap Around to overwrite the data when logger is full or Stop When Full to stop logging data when the logger is full. The user clicks on OK or Cancel to confirm the selection and the selected choice appears in the logger screen next Log mode command button.

Collection Mode specifies the mode in which data is collected to file in the PC specified in data file text box. The user clicks on Collect Mode to open Data Collection mode dialog box. In Data Collection mode dialog box, the user selects Append to add data at the end of existing data file and Overwrite to overwrite the existing file with current logger data. The user then clicks on OK or Cancel to confirm the selection and the selected choice appears in the logger screen next Collect mode command button. Data file displays the file in PC to which logger data is stored. The user clicks on data file command button to change the data file. Logger file dialog box pops up. In this edit file name in the text box or click Browse to open save as dialog box and locate file in the hard disk. After editing, the user should click save to close Save as dialog box, the selected file appears in the file text box. If the selected file is correct, the user clicks OK to close Logger file dialog box. Now, the selected file appears in the data file text box in the Logger screen.

To start retrieve logged data to a file in the PC, the user should make sure logger parameters are selected properly and then click Retrieve data command button. The user should then respond YES at the prompt to continue collecting data and NO to stop the command. Clear logger command should be invoked to delete all the data in the logger and reset logger status.

The preferred embodiment of the present invention has been tested, among other venues, in Lubbock Tex. and in the Modavi Vineyard; representative results are enumerated in the spreadsheets included in Appendices "A" and "B," respectively. The integrity and efficacy of the preferred embodiment should be evident to those skilled in the art.

Other variations and modifications will, of course, become apparent from a consideration of specific embodiments and illustrative examples hereinbefore described. Accordingly, it should be clearly understood that the present invention is not intended to be limited by the particular disclosure, embodiments and examples hereinbefore described and depicted in the accompanying drawings, but that the present invention is to measured by the scope and breadth of the following claims.

What is claimed is:

1. A closed-loop system operated by a user for performing sap flow monitoring and measurement, and for simultaneously performing data-logging thereof in a field having a first plurality of plants, and for simultaneously calculating sap flow attributes for said first plurality of plants based upon said logged sap flow data so that irrigation-water may be applied to replenish water consumed by transpiration of said first plurality of plants in said field; said system comprising:

a dedicated microprocessor for providing real-time automatic closed-loop irrigation control with a second plurality of sensors and devices disposed in said field;

said second plurality of sensors and devices including:

a third plurality of sap flow gauges adapted to be attached to and detached from said first plurality of plants, and for automatically monitoring of said sap flow in said first plurality of plants;

a water reservoir interconnected with a fourth plurality of pipes interconnected with a fifth plurality of valves, for automatically distributing said calculated quantity of said irrigation-water to said first plurality of plants in said field to irrigate said field; and power means interconnected with said dedicated microprocessor and said fourth plurality of pipes interconnected with said fifth plurality of valves for automatically driving said closed-loop system and said quantity of said irrigation-water.

2. Said closed-loop system recited in claim 1, wherein said calculation of said sap flow attributes is triggered according to a time interval predetermined by said user.

3. Said closed-loop system recited in claim 2, wherein said calculation of said sap flow attributes determines depth of water prerequisite for replenishing said measured transpiration losses of said first plurality of plants.

4. Said closed-loop system recited in claim 2, wherein said calculation of said sap flow attributes determines volume of water prerequisite for replenishing said measured transpiration losses of said first plurality of plants.

5. Said closed-loop system recited in claim 1, wherein said irrigation of said field occurs automatically.

6. Said closed-loop system recited in claim 2, wherein said calculation of said water-consumption by said first plurality of plants in said field is functionally related to accumulation of said sap flow of said first plurality of plants allowing compensation for rainfall recorded by a rain gauge, by said soil moisture recorded by said moisture sensor, and by said irrigation recorded by a water meter.

7. Said closed-loop system recited in claim 1, wherein said dedicated microprocessor comprises EEPROM memory.

8. Said closed-loop system recited in claim 6, wherein said sap flow calculations are saved on an hourly basis.

9. Said closed-loop system recited in claim 8, wherein said EEPROM memory stores said saved sap flow calculations.

10. Said closed-loop system recited in claim 6, wherein said sap flow and water balance calculations are saved on a daily basis.

11. Said closed-loop system recited in claim 10, wherein said EEPROM memory stores said saved sap flow calculations.

12. Said closed-loop system recited in claim 10, wherein said sap flow calculations are functionally related to radial energy obtained from said stems of said first plurality of plants.

13. Said closed-loop system recited in claim 10, wherein said sap flow calculations are functionally related to difference between increasing sap temperature and decreasing strip heater temperature.

14. Said closed-loop system recited in claim 1, wherein said field comprises a seventh plurality of plant irrigation zones.

15. Said closed-loop system recited in claim 14, wherein said irrigation-water is calculated based upon a weighted average of said water consumption in each zone of said seventh plurality of plant irrigation zones.

16. Said closed-loop system recited in claim 3, wherein said water prerequisite for replenishing said transpiration losses corresponds to the minimum depth thereof.

17. Said closed-loop system recited in claim 4, wherein said water prerequisite for replenishing said transpiration losses corresponds to the minimum volume thereof.

18. Said closed-loop system recited in claim 1, wherein a pattern of said transpiration losses of said first plurality of plants may be viewed comparatively analyzed relative to environmental conditions.

19. Said closed-loop system recited in claim 18, wherein said irrigation-water may be adjusted according to said relative pattern of transpiration losses.

20. Said closed-loop system recited in claim 1, wherein a PC may be optionally electrically attached thereto for providing a custom-developed, user-friendly graphical user interface for initializing said second plurality of sensors and devices.

21. Said closed-loop system recited in claim 20, wherein said PC provides computerized monitoring and control procedures that are initialized via said graphical user interface.

22. Said closed-loop system recited in claim 20, wherein said PC provides a conventional connection to said communications interface.

23. Said closed-loop system recited in claim 20, wherein said PC is interconnected with said data-logger for receiving sensor results from said data-logger.

24. Said closed-loop system recited in claim 20, wherein said PC enables said user to easily install and configure said closed-loop system via a conventional point-and-click protocol.

25. Said closed-loop system recited in claim 20, wherein said PC enables anomalous data of said logger-data acquired from said second plurality of sensors and devices is filtered-out by a voting function, to promote accuracy of said water-replenishment calculation.

26. Said closed-loop system recited in claim 1, wherein said irrigation-water is controlled electronically.

27. Said closed-loop system recited in claim 1, wherein said irrigation-water is controlled manually.

28. Said closed-loop system recited in claim 1, wherein said calculation of said irrigation-water is functionally related to said first plurality of plants and a eighth plurality of sizes thereof, in said field.

29. Said closed-loop system recited in claim 6, wherein said rain gauge functions automatically.

30. Said closed-loop system recited in claim 1 further comprising a communication interface for communicating said calculated sap flow attributes to remote locations.

* * * * *